(12) United States Patent
Yamaji et al.

(10) Patent No.: US 8,644,594 B2
(45) Date of Patent: Feb. 4, 2014

(54) THREE-DIMENSIONAL IMAGE EDITING DEVICE AND THREE-DIMENSIONAL IMAGE EDITING METHOD

(75) Inventors: Kei Yamaji, Tokyo (JP); Atsushi Misawa, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 239 days.

(21) Appl. No.: 13/247,545

(22) Filed: Sep. 28, 2011

(65) Prior Publication Data

US 2012/0076399 A1    Mar. 29, 2012

(30) Foreign Application Priority Data

Sep. 28, 2010  (JP) ................................ 2010-216598
Aug. 16, 2011  (JP) ................................ 2011-178027

(51) Int. Cl.
*G06K 9/00*    (2006.01)
(52) U.S. Cl.
USPC ........................................................ 382/154
(58) Field of Classification Search
None
See application file for complete search history.

(56) References Cited

U.S. PATENT DOCUMENTS

| | | |
|---|---|---|
| 7,889,196 B2 | 2/2011 | Nomura et al. |
| 2010/0039504 A1* | 2/2010 | Takahashi et al. ............... 348/54 |
| 2013/0009862 A1* | 1/2013 | Chan et al. ...................... 345/156 |
| 2013/0063576 A1* | 3/2013 | Okubo et al. .................... 348/51 |
| 2013/0093849 A1* | 4/2013 | He et al. .......................... 348/43 |
| 2013/0162641 A1* | 6/2013 | Zhang et al. .................... 345/419 |

FOREIGN PATENT DOCUMENTS

JP    2004-349736    12/2004

* cited by examiner

*Primary Examiner* — Vikkram Bali
(74) *Attorney, Agent, or Firm* — Young & Thompson

(57) ABSTRACT

Even when the size of a three-dimensional image is changed, the pop-out amount is automatically adjusted to one intended by the user. The pop-out amount is adjusted based on a conversion characteristic defining a relationship between the size and the pop-out amount of a three-dimensional image as the size of the three-dimensional image is changed, and therefore the pop-out amount of the three-dimensional image can be automatically adjusted to a given pop-out amount preferred by the user or intended by the user.

22 Claims, 15 Drawing Sheets

FIG.6
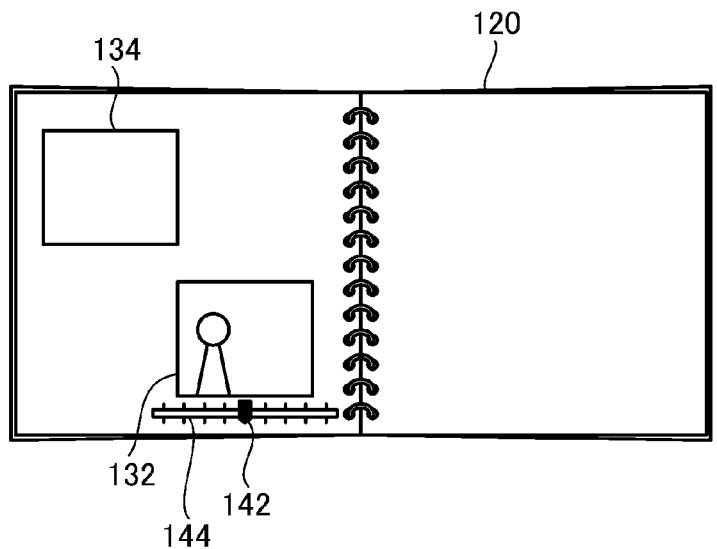
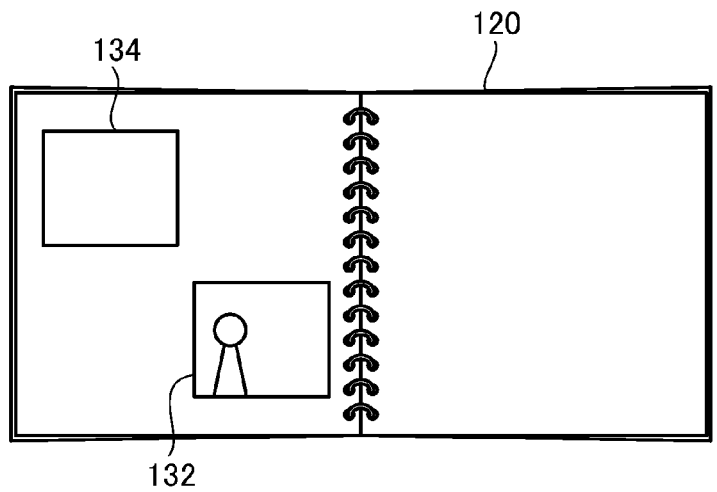
FIG.7A
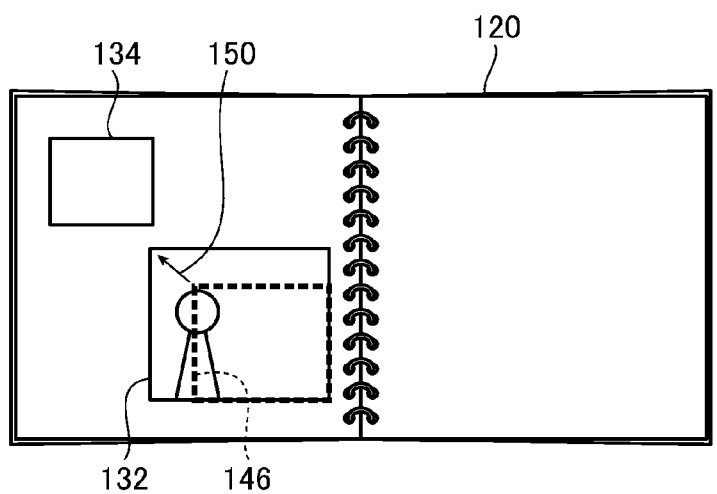
FIG.7B

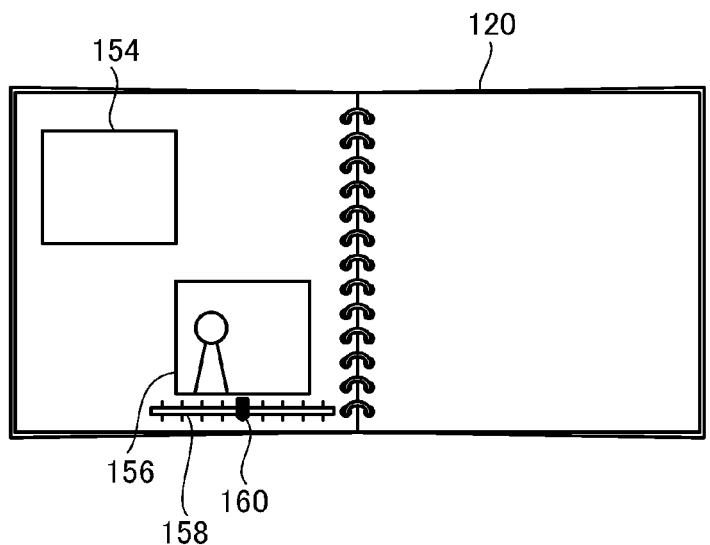
FIG.11A
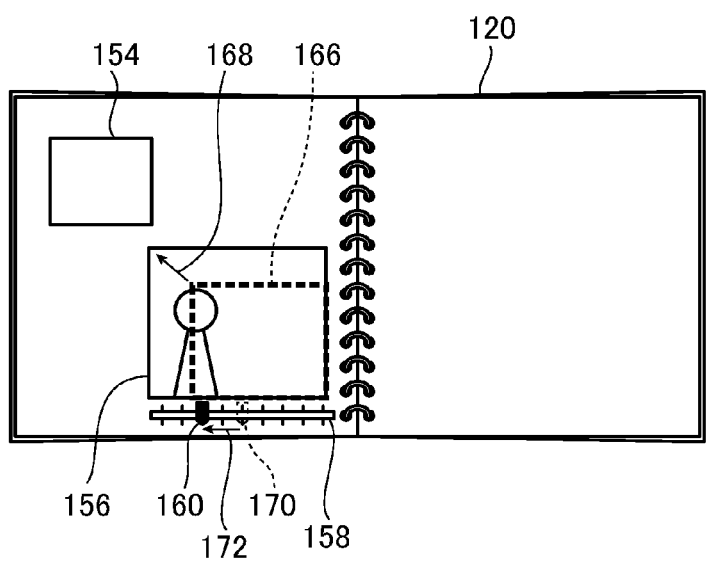
FIG.11B
FIG.12
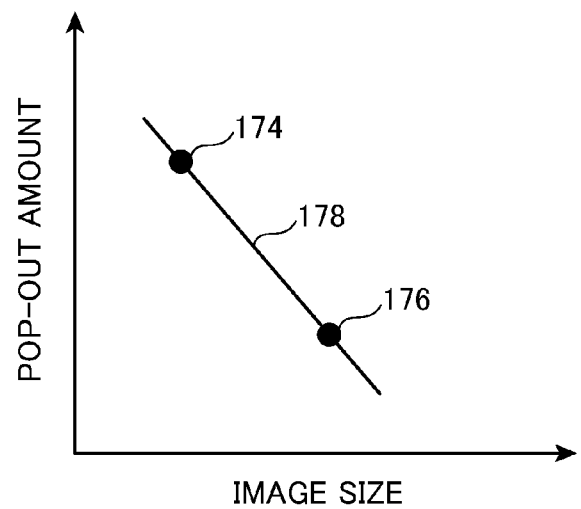

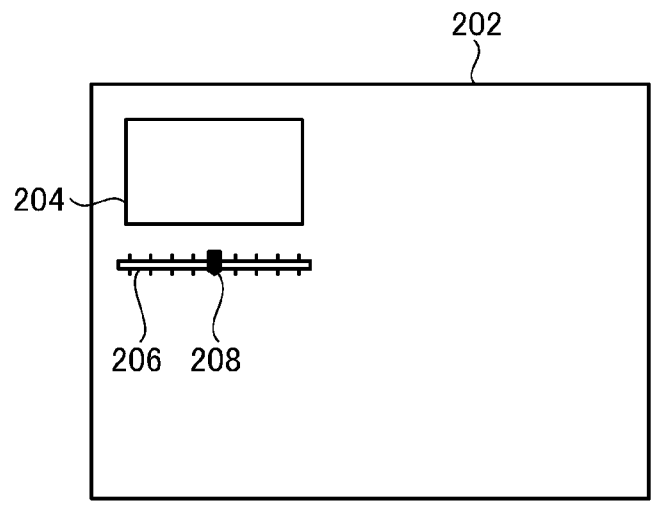
FIG.14A
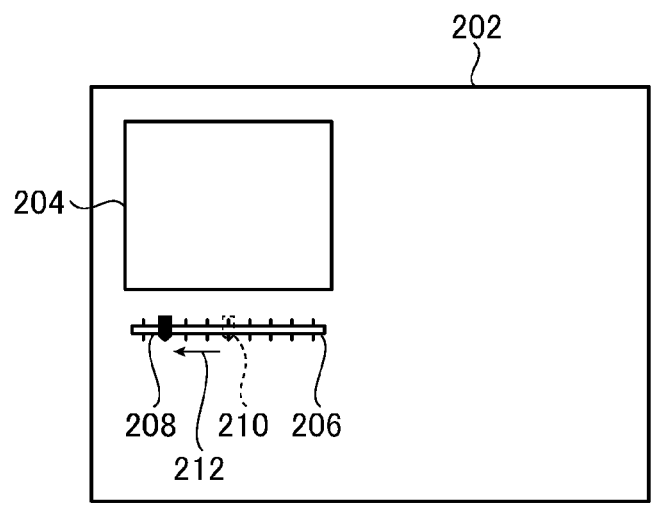
FIG.14B
FIG.15
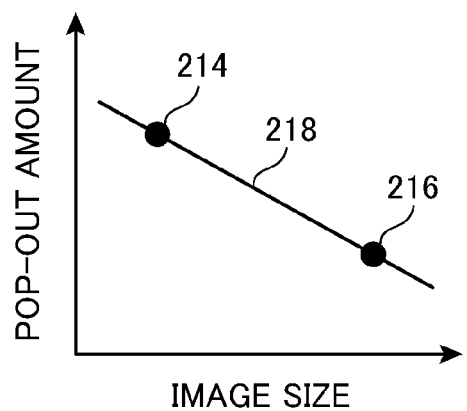

FIG.22
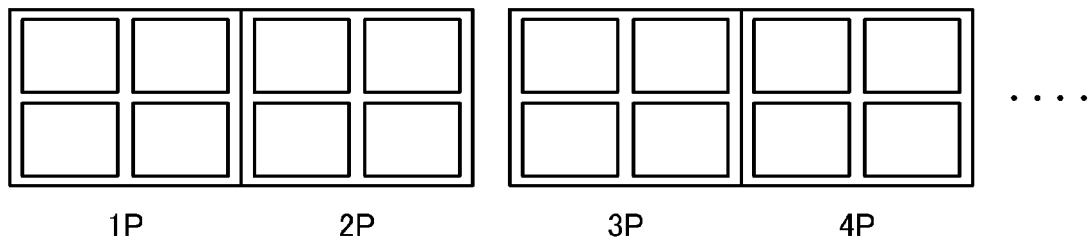
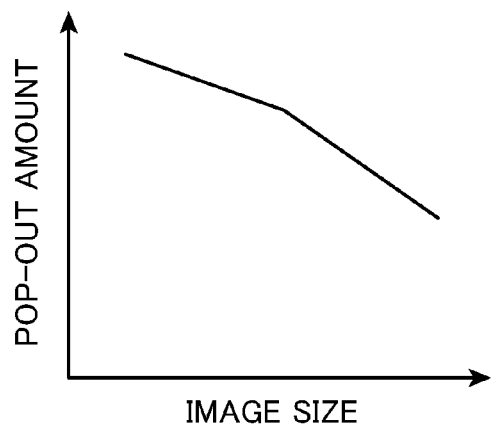
FIG.23A
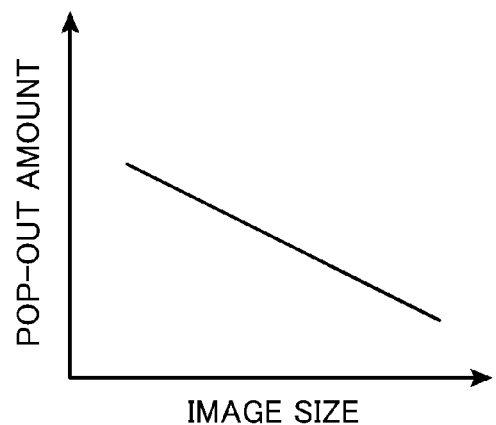
FIG.23B
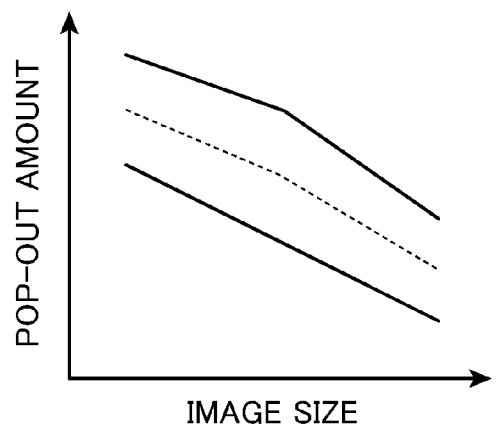
FIG.24

THREE-DIMENSIONAL IMAGE EDITING DEVICE AND THREE-DIMENSIONAL IMAGE EDITING METHOD

BACKGROUND OF THE INVENTION

The present invention relates to a three-dimensional image editing device, a three-dimensional image editing system, a three-dimensional image editing method, and a three-dimensional image editing program for editing a three-dimensional image produced from a plurality of images, and a recording medium on which the program is recorded.

It is known that a human perceives depth when the left and the right eye view an object from different angles and from different distances. The left and the right eye view the object differently and this difference is called a parallax.

There have been hitherto proposed methods of causing a human to perceive a planar image as a three-dimensional image using the principle whereby a human perceives depth. For example, when the same object is imaged from different angles to produce images, one for the right eye and the other for the left eye (a right eye image and a left eye image), and when the right eye image and the left eye image are shown to the right eye and the left eye, respectively, with these images physically displaced rightward and leftward, the human perceives the two planar images as one three-dimensional image. Thus, a parallax is produced by displacing a right eye image and a left eye image with respect to each other. Hereinafter, the amount by which the right eye image and the left eye image are displaced with respect to each other leftward and rightward is called a displacement. When the right eye image and the left eye image are in perfect alignment, the displacement is 0.

Since the human perceives depth to a degree that depends on the degree of parallax, the perceived depth (pop-out amount) of a three-dimensional image can be adjusted by adjusting the displacement between the right eye image and the left eye image. It is also known that expansion and contraction of a three-dimensional image change the displacement between the right eye image and the left eye image and, hence, the pop-out amount as well.

When editing a three-dimensional image, the editor may expand or contract the three-dimensional image. The pop-out amount of a three-dimensional image changes also as it is edited. JP 2004-349736 A describes a three-dimensional image processing device whereby when a three-dimensional image may become difficult to produce a sense of depth or when a three-dimensional image may fail to produce a sense of depth as a result of expansion or contraction thereof, the user is alerted thereto, so that the pop-out amount can be adjusted to an amount permitting comfortable perception of a third dimension.

SUMMARY OF THE INVENTION

When three-dimensional images are edited, however, there are cases where an editor determines the pop-out amounts of three-dimensional images with an intention such, for example, that a particular three-dimensional image is given a greater pop-out amount so as to stand out among the other three-dimensional images around it. Further, when a three-dimensional image is edited, not only the pop-out amount but the size of an image may be changed. Since changing the size of a three-dimensional image also causes the pop-out amount to be changed, it is a complicated task for the editor to readjust the pop-out amount every time the size of a three-dimensional image is changed after the editor determined the pop-out amount of the three-dimensional image with an intention.

The present invention has been made in view of the above and an object of the present invention is to provide a three-dimensional image editing device, a three-dimensional image editing system, a three-dimensional image editing method, a three-dimensional image editing program, and a recording medium on which the program is recorded, enabling automatic adjustment of the pop-out amount of an image, when the image size is changed, to a predetermined pop-out amount preferred or intended by the editor.

In order to attain the object described above, the present invention provides a three-dimensional image editing device, comprising:

an image size changing unit for changing a size of a three-dimensional image, and an adjusting unit for adjusting a pop-out amount of the three-dimensional image according to a change in size of the three-dimensional image effected by the image size changing unit based on a conversion characteristic defining a relationship between an image size of the three-dimensional image and a pop-out amount of the three-dimensional image.

Also, the three-dimensional image editing device further comprises a conversion characteristic producing unit for producing the conversion characteristic based on the change in size and adjustment of the pop-out amount of the three-dimensional image entered through an input unit.

Also, the present invention provides a three-dimensional image editing method, comprising:

an image size changing step of changing a size of a three-dimensional image, and an adjusting step of adjusting a pop-out amount of the three-dimensional image according to a change in size of the three-dimensional image effected by the image size changing step based on a conversion characteristic defining a relationship between an image size of the three-dimensional image and a pop-out amount of the three-dimensional image.

According to the present invention, the pop-out amount of a three-dimensional image is adjusted to an appropriate pop-out amount.

BRIEF DESCRIPTION OF THE DRAWINGS

FIG. 6 is a view illustrating an example of a template image and a three-dimensional image in a pop-out amount adjustment mode.

FIG. 7A is a view illustrating an example of a template image and a three-dimensional image in the pop-out amount adjustment mode; FIG. 7B is a view illustrating a case where a three-dimensional image is expanded.

FIG. 11A is a view illustrating a template image and a three-dimensional image in a conversion characteristic production mode; FIG. 11B is a view illustrating a case where the size of the three-dimensional image has been changed and the pop-out amount has been adjusted.

FIG. 12 is a graph representing a conversion characteristic produced in the conversion characteristic production mode.

FIG. 14A is a view illustrating a template image and a three-dimensional image in an embodiment 2; FIG. 14B is a view illustrating a case where the pop-out amount of the three-dimensional image has been adjusted.

FIG. 15 is a graph representing a conversion characteristic produced in the conversion characteristic production mode.

FIG. 22 illustrates an example of a plurality of pages contained in a photograph album.

FIGS. 23A and 23B are graphs illustrating examples of conversion characteristics applied to page 10 and page 11, respectively.

FIG. 24 is a graph illustrating an example of conversion characteristic that is a mean value of the conversion characteristics for pages 10 and 11 shown in FIGS. 23A and 23B.

DETAILED DESCRIPTION OF THE INVENTION

The following describes the three-dimensional image editing device, the three-dimensional image editing system, the three-dimensional image editing method, the three-dimensional image editing program, and the recording medium on which the program is recorded based on preferred embodiments illustrated in the attached drawings.

Before the present invention is described, a principle of a three-dimensional display for providing a three-dimensional view will be described.

Figure 1:
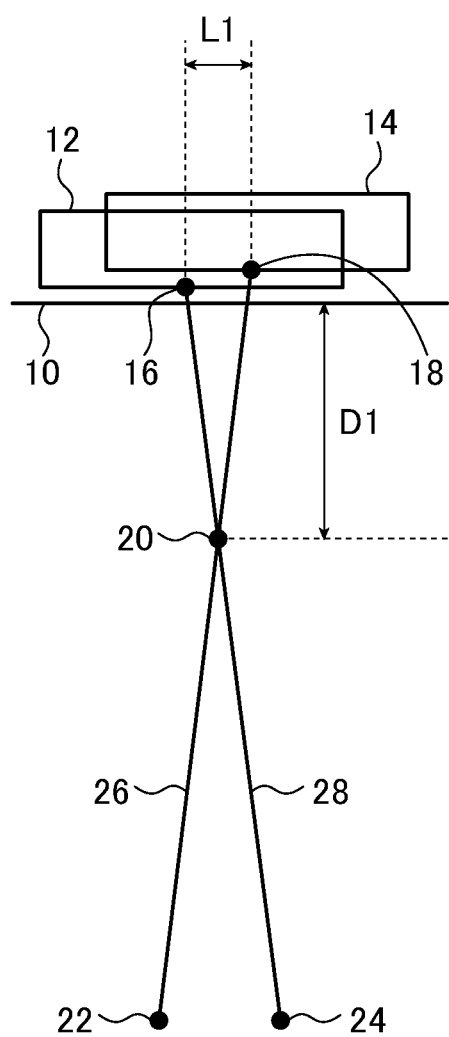
FIG. 1 is a view illustrating a principle of a three-dimensional display.

Referring to FIG. 1, a description will be made of an example of a three-dimensional display for providing a three-dimensional view by showing different images to the left and the right eye. FIG. 1 is a view describing a three-dimensional display as seen from above and lines of sight to explain a principle of a three-dimensional display. A three-dimensional display 10 displays a right eye image 12 and a left eye image 14. The right eye image 12 is displayed only to the right eye viewing from a point 24. The left eye image 14 is displayed only to the left eye viewing from a point 22.

Now consider a case where a point 16 representing a subject exists on the right eye image 12, and a point 18 representing the same subject exists on the left eye image 14. Hereinafter, points in the right eye image and the left eye image representing the same subject such as the point 16 and the point 18 will be called corresponding points. The three-dimensional display 10 displays the right eye image 12 and the left eye image 14 that are physically displaced in the left and right direction as seen in the drawing. In this case, the distance between the point 16 and the point 18 for the left and the right eye is L1. Note that the right eye image 12 and the left eye image 14 are displayed in reality on the three-dimensional display 10 and thus the three-dimensional display 10, the right eye image 12, and the left eye image 14 are not displaced with respect to each other in the vertical direction as seen in the drawing, but for the sake of clarity, the drawing shows the three-dimensional display 10, the right eye image 12, and the left eye image 14 displaced in the vertical direction. Note also that the drawing shows the right eye image 12 and the left eye image 14 as having a thickness in the vertical direction as seen in the drawing, but these images do not have the thickness because in reality these images are displayed on the three-dimensional display 10.

A human viewing the three-dimensional display 10 providing such a display perceives the subject represented by the point 16 and the point 18 to be located at a position shown by a point 20 where a line of sight 26 of the left eye viewing the point 18 and a line of sight 28 of the right eye viewing the point 16 intersect. In this case, the subject represented by the point 16 and the point 18 is perceived to be projecting from the three-dimensional display 10 by a distance of D1 between the three-dimensional display 10 and the point 20. The pop-out amount in this case is the distance D1 between the three-dimensional display 10 and the point 20. The three-dimensional display 10 causes the human viewer to perceive the subject to be projecting from the three-dimensional display 10 due to the displacement between the right eye image 12 and the left eye image 14 in the left and right direction as seen in the drawing and the parallax between the right eye image 12 and the left eye image 14. The same principle may be used to produce a sense of depth on the farther side of a three-dimensional image and thereby cause the human to perceive an object to be on the farther side of the three-dimensional display 10. Since the human perceives depth due to parallax, the pop-out level (pop-out amount) of the three-dimensional image can be adjusted by adjusting the displacement between the right eye image and the left eye image to adjust the degree of parallax (amount of parallax).

Figure 2:
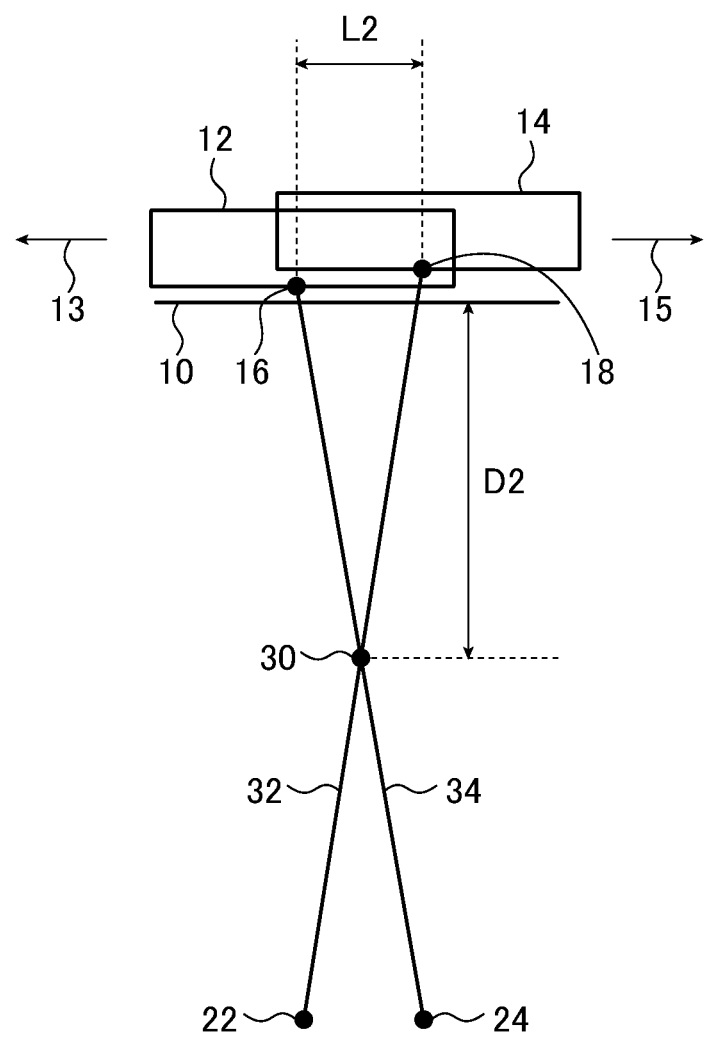
FIG. 2 is a view illustrating a principle of adjusting the pop-out amount of a three-dimensional display.

FIG. 2 is a view illustrating a case where the displacement between the right eye image 12 and the left eye image 14 is changed in the three-dimensional display 10 to change the pop-out amount of the image. Suppose that the right eye image 12 is moved leftward (in a direction indicated by an arrow 13), and the left eye image 14 is moved rightward (in a direction indicated by an arrow 15), to display the right eye image 12 and the left eye image 14 with a distance L2 (>L1) between the point 16 and the point 18. In such a case, the human perceives the subject to be located at a position shown by a point 30 where a line of sight 32 of the left eye viewing the point 18 and a line of sight 34 of the right eye viewing the point 16 intersect. Since the distance between the three-dimensional display 10 and the point 30 is D2 (>D1), the pop-out amount in this case is D2. Thus, the pop-out amount by the human can be changed by changing the displacement.

However, excessively increasing the displacement results in producing an excessively great strain on the user's eyes, and further increasing the displacement makes depth perception impossible because of the structure of the human eye. The range of a settable displacement depends on the lateral length of the three-dimensional image (the length in the direction in which the right eye image and the left eye image are displaced); the range of a settable displacement increases with the image size.

Figure 3:
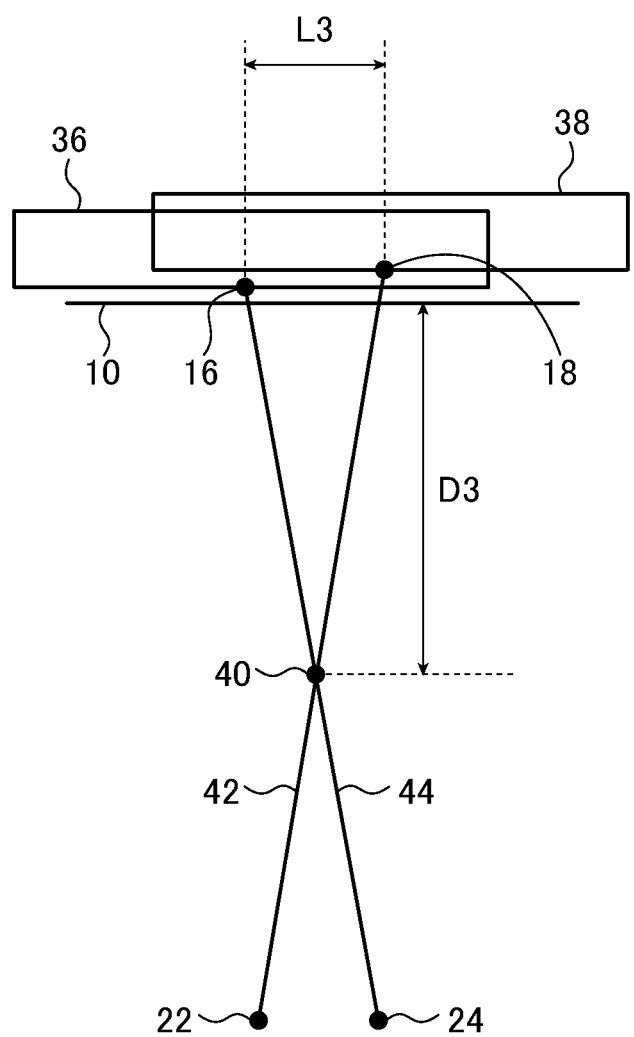
FIG. 3 is a view illustrating a change in the pop-out amount resulting from expansion of a right-eye image and a left-eye image.

With the three-dimensional display 10 based on such principle, expansion and contraction of the three-dimensional image cause the pop-out amount to change. FIG. 3 shows the right eye image 12 and the left eye image 14 illustrated in FIG. 1 as expanded. Expansion of the three-dimensional image is effected by expanding the right eye image 12 and the left eye image 14. In the expanded right eye image 36 and the expanded left eye image 38, the positions of the point 16 and the point 18 move as the images are expanded, particularly as the length in the lateral direction changes, making the distance between the point 16 and the point 18 L3 (>L1). In such a case, the human perceives the subject to be located at a position shown by a point 40 where a line of sight 42 of the left eye viewing the point 18 and a line of sight 44 of the right eye viewing the point 16 intersect, making the pop-out amount D3 (>D1). Thus, as the three-dimensional image expands, the pop-out amount of the three-dimensional image also increases. Note that when the three-dimensional image is contracted, the pop-out amount decreases.

Based on the above facts, the inventors of the present invention found that when the size of a three-dimensional image is changed, the pop-out amount can be automatically adjusted to a predetermined pop-out amount preferred and intended by the user through automatic adjustment of the pop-out amount of the three-dimensional image performed according to the change in the size of the three-dimensional image by using a conversion characteristic defining the relationship between the size and the pop-out amount of the three-dimensional image, and the findings have led to the present invention. According to the present invention, since the pop-out amount depends on the parallax between the right eye image and the left eye image, the pop-out amount varies for the same three-dimensional image depending on the position of the subject in the depth direction of the image. For clarity, the pop-out amount in the following description denotes the pop-out amount for corresponding points farthest displaced when the displacement between the right eye image and the left eye image is 0, i.e., corresponding points on a subject located closest to the viewer.

That is, since the right eye image and the left eye image are images acquired by imaging the same subject from different angles, there originally is a parallax between a shot image for the right eye and a shot image for the left eye even when the physical displacement between the right eye image and the left eye image displayed on a display medium such as a display device is 0. Making the displacement between the right eye image and the left eye image 0 does not place the right eye image and the left eye image in perfect alignment, leaving the corresponding points representing the same subject still displaced from each other, which produces a parallax between the original shot image for the right eye and the original shot image for the left eye.

Accordingly, when the right eye image and the left eye image are displayed, one physically displaced with regard to the other in the left-and-right direction, the magnitude of the displacement of the corresponding points representing the same subject in the right eye image and the left eye image may be expressed as the sum of the physical displacement and the magnitude of the displacement between the corresponding points due to the parallax originally existing between the shot image for the right eye and the shot image for the left eye. Since, as described above, the physical displacement between the right eye image and the left eye image produces a parallax, the magnitude of the displacement between the right eye image and the left eye image, i.e., the distance between the corresponding points, is the magnitude of a parallax sensed by the human and may be said to denote a degree of parallax. Such degree of parallax may also be referred to, for example, as parallactic angle or parallax amount.

On the other hand, since the pop-out amount of the three-dimensional image depends on the distance between the corresponding points on the right eye image and the left eye image as descried above, the pop-out amount may be said to depend on the degree of the parallax expressed by this distance between the corresponding points.

The shot image for the right eye and the shot image for the left eye described above may contain different, various subjects in the depth direction and, as is known, the displacement between the corresponding points on a subject located farther from the human viewer is smaller, while the displacement between the corresponding points on a subject located closer to the human viewer is greater. This also applies when the physical displacement between the right eye image and the left eye image is 0. Therefore, to be exact, the displacement between the corresponding points on a subject varies depending on the individual subjects contained in a shot image. However, since a shot image typically shows a major subject in the foreground, it is often preferable to use a subject located in the foreground as a reference.

Thus, according to the invention, the pop-out amount of a three-dimensional image is determined, as a reference, as the pop-out amount of the corresponding points on a subject in the foreground when the displacement between the right eye image and the left eye image is 0.

Now, embodiments of the present invention will be described below based on the appended drawings.

Embodiment 1

Figure 4:
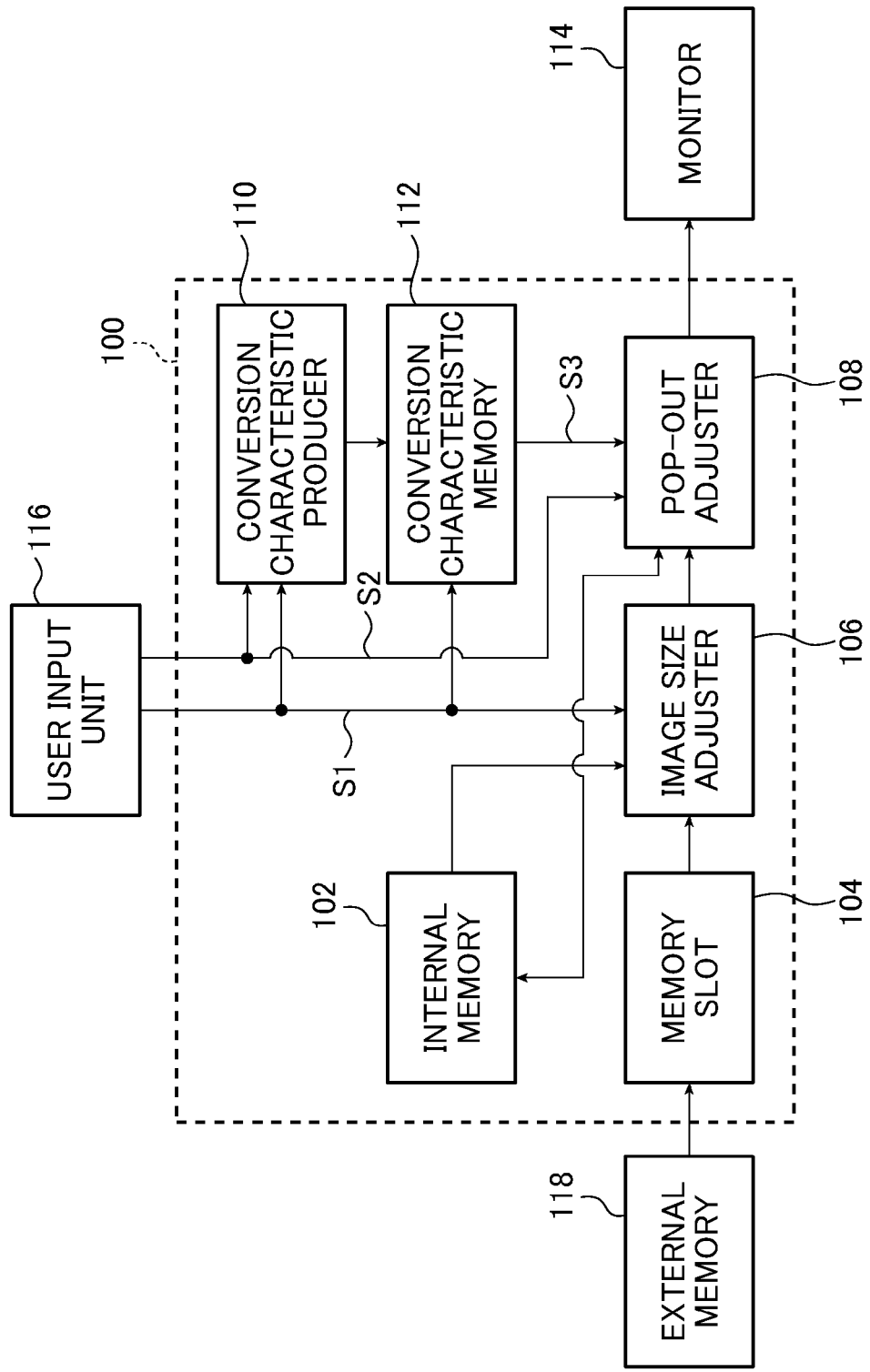
FIG. 4 is a function block diagram illustrating a three-dimensional image editing device according to an embodiment 1 of the present invention.

FIG. 4 is a function block diagram illustrating major components of a three-dimensional image editing device 100 according to the embodiment 1 of the present invention. The three-dimensional image editing device 100 comprises an internal memory 102, a memory slot 104, an image size adjuster 106, a pop-out amount adjuster 108, a conversion characteristic producer 110, and a conversion characteristic memory 112. In use, the three-dimensional image editing device 100 is electrically connected to a monitor 114, a user input unit 116, and an external memory 118.

The monitor 114 is capable of three-dimensional display. The three-dimensional display may be of any known type. Examples of the type of the three-dimensional display include parallax division type such as parallax barrier type and lenticular lens type; and image separating type using special eyeglasses such as color filter type, polarization filter type, and liquid crystal shutter type.

The user input unit 116 is provided for the user to make entries and may be, for example, a mouse and a keyboard.

The internal memory 102 stores left eye images and right eye images for producing three-dimensional images.

The memory slot 104 electrically connects the three-dimensional image editing device 100 and the external memory 118. When the memory slot 104 is connected with the external memory 118, the three-dimensional image editing device 100 can read out data such as an image stored in the external memory 118.

The image size adjuster 106 adjusts the size of an image read out from the internal memory 102 or the external memory 118. In response to an instruction for size change entered by the user through the user input unit 116, the image size adjuster 106 expands or contracts the image size of the right eye image and the left eye image in response to an image size change signal (S1) outputted from the user input unit 116.

The pop-out amount adjuster 108 changes the displacement between the right eye image and the left eye image outputted from the image size adjuster 106 and of which the size has been changed by the image size adjuster 106 and changes the degree of parallax to adjust the pop-out amount of the three-dimensional image. As described above, the adjustment of the right eye image and the left eye image is effected using as a reference the distance between the corresponding points farthest apart from each other when the right eye image and the left eye image are superposed in precise alignment (the corresponding points on a subject located in the foreground in the image). In response to an instruction for three-dimensional image pop-out amount adjustment entered by the user through the user input unit 116, the pop-out amount adjuster 108 adjusts the pop-out amount of the three-dimensional image according to the pop-out amount adjusting signal (S2) outputted from the user input unit 116. Further, the pop-out amount adjuster 108 converts the image data of the right eye image and the left eye image where the pop-out amount of the three-dimensional image has been adjusted into a format as required by the monitor 114 and outputs the converted image data to the monitor 114.

The monitor 114 uses the image data of the right eye image and the left eye image outputted from the pop-out amount adjuster 108 to display the right eye image and the left eye image three-dimensionally on the display screen. The monitor 114 permits selection between three-dimensional display and planar display on the display screen.

The conversion characteristic producer 110 produces a conversion characteristic representing a relationship between the image size and the pop-out amount from the image size change signal (S1) and the pop-out amount adjustment signal (S2) outputted from the user input unit 116.

The conversion characteristic memory 112 stores the conversion characteristic representing the relationship between the image size and the pop-out amount of the three-dimensional image produced previously or produced by the conversion characteristic producer 110 and stores the conversion characteristic representing the relationship between the magnitude of the image size and the pop-out amount in the form of, for example, a relational expression and a unidimensional LUT. The conversion characteristic memory 112 stores one or more kinds of previously produced conversion characteristics. The conversion characteristic memory 112 stores conversion characteristics produced by the conversion characteristic producer 110.

As conversion characteristics, the conversion characteristic memory 112 may store, for example, a relational expression and a unidimensional LUT representing the relationship between the magnitude of the image size and the displacement between the right eye image and the left eye image.

The pop-out amount adjuster 108 reads out from the conversion characteristic memory 112 a relational expression of the conversion characteristic according to the image size changed by the image size adjuster 106 and calculates the value (S3) of the pop-out amount. The pop-out amount adjuster 108 may be adapted to read out the value (S3) of the pop-out amount directly from the unidimensional conversion characteristic LUT stored in the conversion characteristic memory 112 according to the image size changed by the image size adjuster 106. Further, the conversion characteristic memory 112 may be adapted to determine a conversion characteristic to be used when supplied with the image size adjustment signal (S1) outputted from the user input unit 116, so that the pop-out amount adjuster 108 may use the determined conversion characteristic to calculate the value (S3) of the pop-out amount according to the image size.

The pop-out amount adjuster 108 obtains the displacement between the right eye image and the left eye image from the change in image size effected by the image size adjuster 106 or the changed image size and the value of the pop-out amount calculated from the conversion characteristic read out from the conversion characteristic memory 112 or the value of the pop-out amount as directly read out from the conversion characteristic memory 112, adjusts the displacement between the right eye image and the left eye image to the obtained displacement thereby to adjust the pop-out amount of the three-dimensional image.

When the conversion characteristic memory 112 stores therein as a conversion characteristic the relationship between the magnitude of the image size and the displacement between the right eye image and the left eye image, the pop-out amount adjuster 108 may obtain the displacement between the right eye image and the left eye image according to the magnitude of the image size as changed by the image size adjuster 106 stored in the conversion characteristic memory 112.

Upon completion of arrangement of the three-dimensional image in a template image 120, change in size of the three-dimensional image, and adjustment of the pop-out amount of the three-dimensional image, the user instructs the three-dimensional image editing device 100 to terminate editing of the photograph album. Because the template image has the sizes and positions of images previously determined according to the kind (e.g., one large image placed at the center, or two images placed one above the other), so that upon images being placed in their respective positions, their sizes are automatically adjusted by the image size adjuster 106.

The three-dimensional image editing device 100 stores in the internal memory 102 data of the photograph album as of the time when the editing termination instruction is received from the user, such as, for example, data of a correlation among the template image being used, a three-dimensional image placed in the template image, and the position of the three-dimensional image in the template image, and the pop-out amount of the three-dimensional image. The three-dimensional image editing device 100 outputs the photograph album data therein stored to a printer (not shown) via a network or the like.

Figure 5:
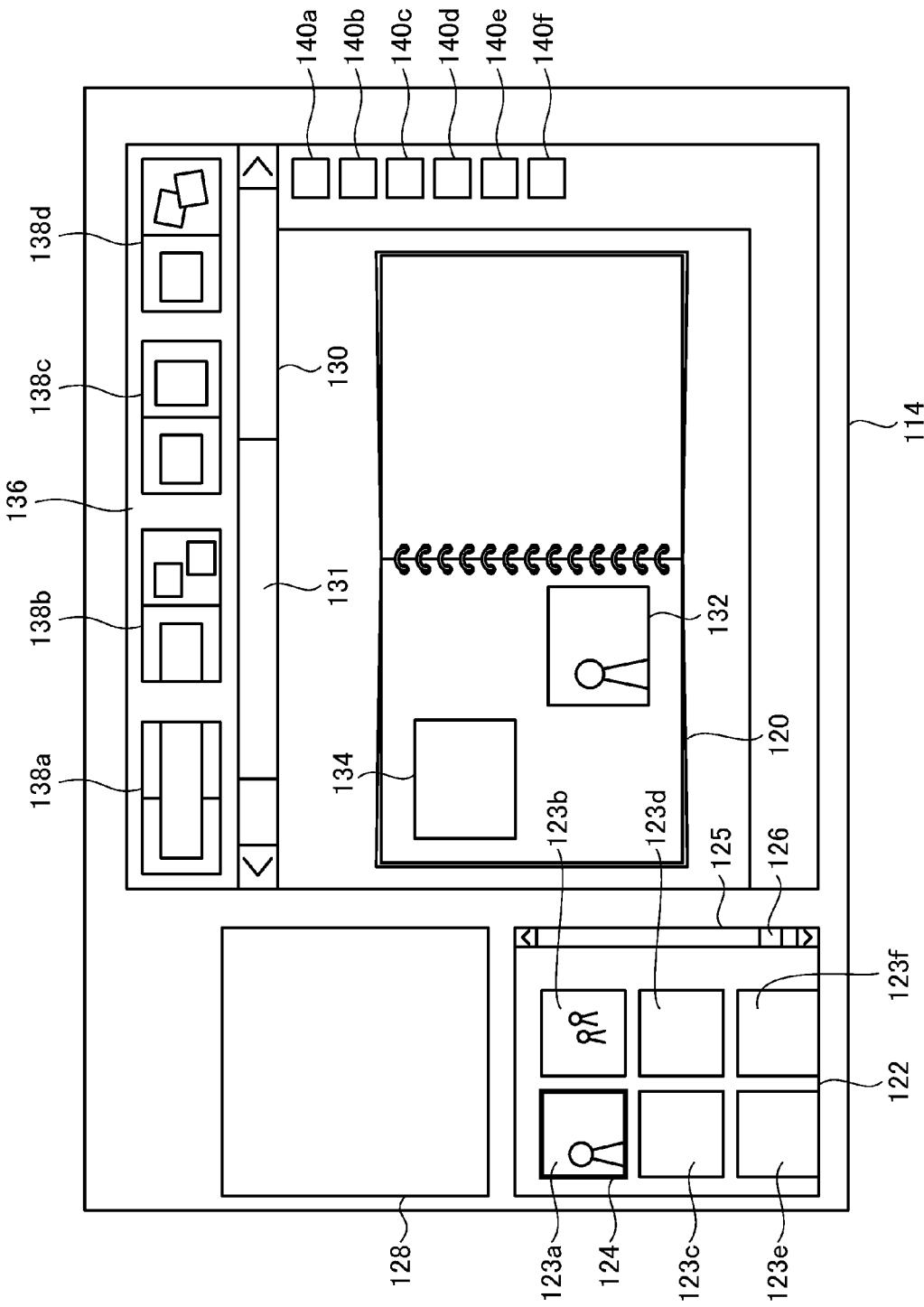
FIG. 5 is a view illustrating an example of an editing screen displayed on a monitor.

FIG. 5 illustrates an example of an editing screen displayed on the monitor 114. The editing screen is displayed to enable editing of the photograph album that is produced by arranging three-dimensional images in the template image.

The photograph album is an album of photographs produced by a commissioned company or the like using pages produced by the user by arranging images with a computer and the like.

The template image is an image showing a template in which the sizes of photographs, the positions of the photographs in each page, and the like are generally predetermined. The template image can be freely selected by the user. A variety of template images are previously stored which differ in, for example, the size of the photograph album, the background color, the number of photographs contained in one page, and the layout of photographs. From among them, the user selects one he/she prefers to produce a photograph album that suits his/her preference.

The user uses the mouse or the like of the user input unit 116 to dispose images in the template image and adjust the sizes of the images to place an order for a photograph album having desired photographs arranged in desired positions.

The monitor 114 shows at its center the template image 120, which is an image of a book representing a photograph album. The user positions images within a region defined by the template image 120 to determine a layout of images to be arranged in the photograph album. The template image 120 has positions in which the images are arranged and the sizes of the images predetermined. Accordingly, when the user positions the images in the template image 120 using the user input unit 116, the image size adjuster 106 automatically disposes the images in their predetermined positions and automatically adjusts them to their predetermined sizes. While as described above the positions in which the images are arranged and the sizes of the images are automatically adjusted to predetermined positions and sizes according to the selected template image 120, the user may change the positions and the sizes of the images after the automatic adjustment by using the user input unit 116. In this example, three-dimensional images 132 and 134 are disposed within the region defined by the template image 120. The three-dimensional images 132 and 134 are displayed three-dimensionally.

In an image display region 122 provided at the lower left of the screen on the monitor 114, six three-dimensional images 123a to 123f to be disposed in the template image 120 are displayed three-dimensionally. The three-dimensional images 123a to 123f are images stored in the internal memory 102 or the external memory 118. The data of the three-dimensional images stored in the internal memory 102 or the external memory 118 is so stored that the right eye image, the left eye image, and tag information are associated with each other as one piece of data. The tag information stores the pop-out amounts of the right eye image and the left eye image. The tag information may store the displacement between the right eye image and the left eye image corresponding to an image on display at the time of imaging to enable the pop-out amount in accordance with the displacement stored in the pop-out amount adjuster 108 to be obtained when the image is displayed on the monitor 114. The three-dimensional image displayed in the image display region 122 is displayed three-dimensionally with a previously stored pop-out amount.

The user uses the mouse of the user input unit 116 to drag the images displayed in the image display region 122 and drop them in the template image 120 to determine the layout in the photograph album. A scroll bar 125 is provided on the right side of the image display region 122; a knob 126 that can be moved in the vertical direction as seen in the drawing is provided in the scroll bar 125. The user uses the mouse to drag the position of the knob 126 in the vertical direction as seen in the drawing to scroll the images displayed in the image display region 122. This operation allows images stored in the internal memory 102 or the external memory 118 and not displayed in the image display region 122 to be displayed in the image display region 122.

Above the image display region 122, a display region 128 is provided. The display region 128 shows a folder hierarchy structure. The folder hierarchy structure shown in the display region 128 enables the user to know which folder contains the images displayed in the image display region 122. By selecting another folder displayed in the display region 128, the user can cause the images stored in another folder to be displayed in the image display region 122.

Further, the display region 128 can display, enlarged, an image selected from the image display region 122 with a cursor 124 by using the mouse or the like. The position of the cursor 124 can be freely moved by the user with the mouse or the like. With an image shown enlarged, the user can observe the image in detail. When necessary, an image selected by the user from among the images in the template image 120 can be shown enlarged in the display region 128.

There is displayed above the template image 120 a reduced page display region 136 showing size-reduced images arranged in the individual pages constituting the photograph album. The reduced page display region 136 shows images in size-reduced pages 138a to 138d each in double-page spread.

Beneath the reduced page display region 136, a scroll bar 130 is provided. The user can cause the pages now outside the reduced page display region 136 to be displayed in the reduced page display region 136 by dragging a knob 131 provided in the scroll bar 130 in the left-and-right direction as seen in the drawing using the mouse or the like.

On the right side of the template image 120 are provided six editing buttons 140a to 140f. The editing buttons 140a to 140f are each assigned editing functions. The user pushes the editing buttons using the mouse or the like to edit images arranged in the photograph album. The editing button 140b is assigned, for example, an image size change function. The user pushes the editing button 140b to select an image size change mode. Other editing functions include, for example, synthesis of characters with the template image 120, removal of an image from the template image 120, and production of a conversion characteristic for automatically determining the pop-out amount of the three-dimensional image.

The editing button 140a is assigned an image pop-out amount adjustment function. FIG. 6 illustrates an example of the template image 120 that is displayed when the editing button 140a is pushed to select a pop-out amount adjustment mode. FIG. 6 shows the template image 120 and the three-dimensional image 132 and the three-dimensional image 134 placed in the template image 120 as extracted from the monitor 114. Hereinafter, unless otherwise specified, the drawings illustrating the template image 120 and the three-dimensional images displayed in the template image 120 thus show a part of the whole image displayed on the monitor 114.

Push of the editing button 140a causes a scroll bar composed of a knob 142 and a scaled bar 144 to be shown beneath the three-dimensional image 132 disposed in the template image 120. The user uses the mouse or the like to move the knob 142 in the left-and-right direction as seen in the drawing to adjust the pop-out amount. The length of the bar 144 shows a range of pop-out amount that can be set for the size of the three-dimensional image 132. Each three-dimensional image has a maximum pop-out amount, which depends on its image size, up to which the human can perceive depth thereof. Therefore, the range within which the pop-out amount can be adjusted depends on the size of the three-dimensional image. Since the range within which the pop-out amount can be adjusted broadens as the size of the three-dimensional image increases, the length of the bar 144 grows longer as the size of the three-dimensional image increases.

The more the knob 142 is moved rightward, the greater the pop-out amount of the three-dimensional image 132 grows; the more the knob 142 is moved leftward, the smaller the pop-out amount of the three-dimensional image 132 grows. The three-dimensional image editing device 100 stores the size of the three-dimensional image 132 having an adjusted pop-out amount and the value of the pop-out amount adjusted by the user in the conversion characteristic producer 110. For ease of explanation, FIG. 6 shows the knob 142 and the bar 144 only beneath the three-dimensional image 132, but the knob 142 and the bar 144 are displayed also beneath the three-dimensional image 134 in the pop-out amount adjustment mode to enable adjustment of the three-dimensional image 134.

FIG. 7A illustrates an example of the template image 120, the three-dimensional image 132, and the three-dimensional image 134 that are displayed when the editing button 140b is pushed to select an image size adjustment mode. The user can expand or contract a three-dimensional image disposed in the template image 120 by dragging an edge thereof with the mouse or the like.

FIG. 7B illustrates a case where the three-dimensional image 132 has been expanded. A dotted line 146 shows the size of the three-dimensional image 132 before expansion. The user can expand the three-dimensional image 132 by dragging the top left portion of the three-dimensional image 132 in a direction indicated by an arrow 150. Likewise, the user can contract the three-dimensional image 134 by dragging the bottom right portion of the three-dimensional image 134 towards top left.

A change in the size of a three-dimensional image causes the displacement between the right eye image and the left eye image constituting the three-dimensional image to change and, hence, the pop-out amount of the three-dimensional image to differ from the pop-out amount of the three-dimensional image as of before the change in the size.

Figure 8:
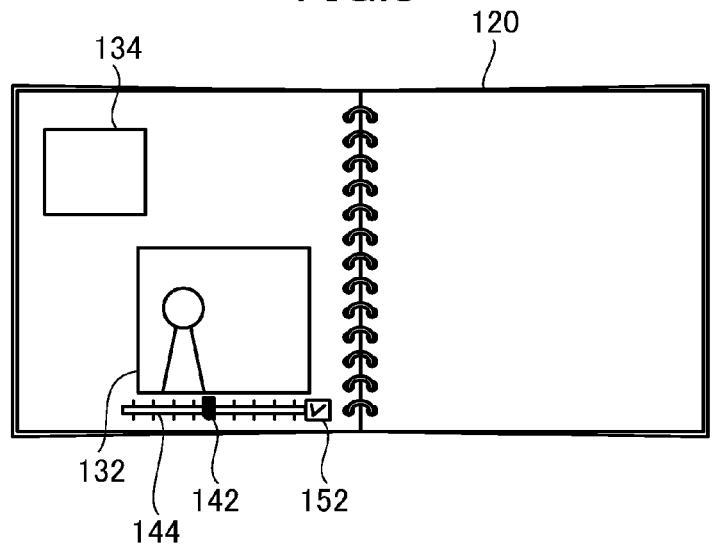
FIG. 8 is a view illustrating an example of a template image and a three-dimensional image in a case where the pop-out amount of the three-dimensional image is to remain constant.

FIG. 8 illustrates the template image 120 displayed when the user pushes the editing button 140a after the image 132 has been expanded. When the user moves the knob 142 to adjust the pop-out amount, the adjusted pop-out amount is stored in the conversion characteristic memory 112, and a check box 152 appears on the right side of the bar 144. The user can lock the pop-out amount of the image 132 by clicking the check box 152. Thus, after the check box 152 is clicked, the pop-out amount remains constant even when the size of the image 132 is changed. The pop-out amount is unlocked by unchecking the check box 152.

Figure 9:
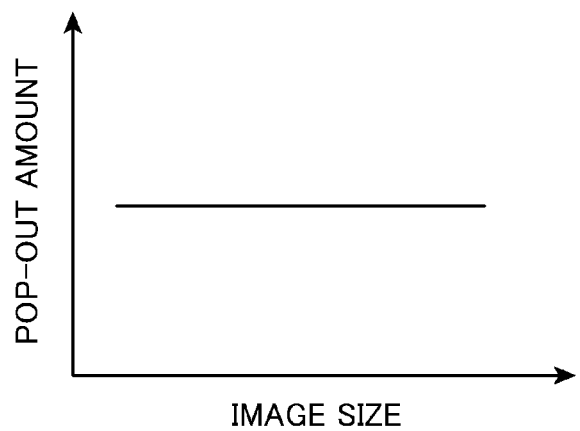
FIG. 9 is a graph illustrating a conversion characteristic for keeping the pop-out amount of a three-dimensional image constant.

FIG. 9 illustrates a conversion characteristic graph representing a relationship between the image size and the pop-out amount when the user has locked the pop-out amount. In the following graphs illustrating the relationship between the image size and the pop-out amount, the image size denotes the length of a three-dimensional image in the lateral direction. The conversion characteristic illustrated in FIG. 9 shows that the pop-out amount remains constant as the image size increases. This is a conversion characteristic whereby the pop-out amount is locked to a value of pop-out amount set by the user. This conversion characteristic is stored in the conversion characteristic memory 112.

When instructed by the user to change the image size, the pop-out amount adjuster 108 adjusts the displacement between the right eye image and the left eye image in order to keep the pop-out amount constant. Specifically, since expansion of a three-dimensional image causes the pop-out amount to increase, the displacement between the left eye image and the right eye image is reduced to keep constant the distance between the corresponding points on the right eye image and the left eye image. Since, on the other hand, contraction of a three-dimensional image causes the pop-out amount to decrease, the displacement between the left eye image and the right eye image is increased to keep constant the distance between the corresponding points on the right eye image and the left eye image. Thus, when the user has locked a determined pop-out amount, the pop-out amount remains unchanged even when the size of a three-dimensional image is thereafter changed, obviating the necessity of readjusting the pop-out amount.

Figure 10:
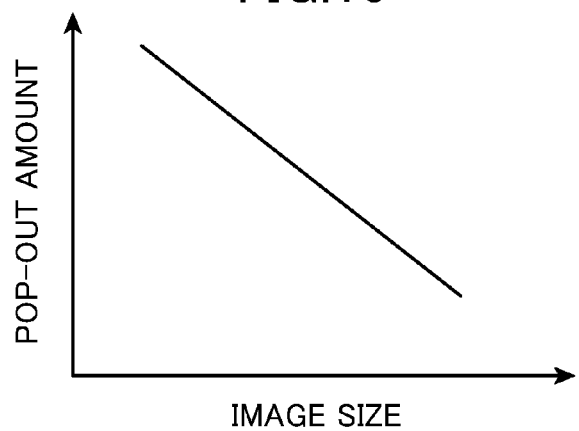
FIG. 10 is a graph illustrating a conversion characteristic for reducing the pop-out amount of a three-dimensional image as the size of the three-dimensional image is changed.

FIG. 10 illustrates another example of the conversion characteristic previously stored in the conversion characteristic memory 112. The conversion characteristic illustrated in FIG. 10 allows the pop-out amount to decrease as the image size increases. When, for example, the user doubles the size of a three-dimensional image, the pop-out amount of the three-dimensional image as of after the expansion is a half of the pop-out amount of the three-dimensional image as of before the expansion. Since the strain placed on the human eye increases with the size of the three-dimensional image, reducing the pop-out amount of the image as of after expansion can reduce the strain.

Thus, use of the conversion characteristics previously stored in the conversion characteristic memory 112 obviates the necessity of the manual operation by the user and enables the conversion characteristic to be determined automatically. What conversion characteristic to use is set by the user using a setting screen or the like.

Next, reference is made to FIGS. 11A and 11B to describe a case where the user performs an operation to produce a new conversion characteristic. Although the conversion characteristics are previously stored in the conversion characteristic memory 112, there are cases where the previously stored conversion characteristics alone cannot suit the purpose since different users prefer different conversion characteristics. To produce a conversion characteristic preferred by the user, a new conversion characteristic is produced based on values entered by the user. When producing a new conversion characteristic, the user pushes an editing button to select a conversion characteristic production mode.

FIG. 11A illustrates a case where the user disposes a three-dimensional image 156 in the template image 120 and adjusts the pop-out amount. The user slides a knob 160 in a bar 158 displayed beneath the three-dimensional image 156. The pop-out amount entered by the user and the resulting size of the three-dimensional image (length in the lateral direction) are stored in the conversion characteristic producer 110.

FIG. 11B illustrates a case where the user expands the three-dimensional image 156 and, furthermore, adjusts the pop-out amount. A dotted line 166 shows the size of the three-dimensional image 156 before expansion. The three-dimensional image 156 is expanded by being dragged in a direction indicated by an arrow 168. A broken line 170 shows the position of the knob 160 for the image as of before the expansion. Suppose that, after expanding the three-dimensional image 156, the user moved the knob 160, which was located in the position shown by the broken line 170, in a direction indicated by an arrow 172 to adjust the pop-out amount.

Now, we will describe how the conversion characteristic is produced in the case shown in FIGS. 11A and 11B by referring to a graph shown in FIG. 12 representing the relationship between the image size and the pop-out amount. A point 174 plotted in the graph in FIG. 12 indicates a point representing the image size and the pop-out amount both set by the user for the image 156 yet to be expanded. A point 176 plotted in the graph indicates a point representing the image size and the pop-out amount both set by the user for the expanded image 156. The conversion characteristic producer 110 produces a line 178 passing through the two points, point 174 and the point 176, to obtain a conversion characteristic. That is, the conversion characteristic producer 110 can produce the conversion characteristic by determining two points representing an image size and a pop-out amount set by the user. Use of this conversion characteristic enables estimation of a pop-out amount preferred by the user for another image size. The produced conversion characteristic is stored in the conversion characteristic memory 112 so that it can be used again for the next time.

When the user expands or contracts the three-dimensional image 156 after the conversion characteristic is produced, the pop-out amount of the three-dimensional image 156 is determined according to this conversion characteristic. That is, the three-dimensional image editing device 100 can automatically adjust the pop-out amount of a three-dimensional image to a pop-out amount preferred by the user based on an image size and a pop-out amount set by the user. When the conversion characteristic is produced in this manner, the conversion characteristic can be produced according to the preference of the user.

The previously stored conversion characteristics and a newly produced conversion characteristic may be selectively used according to the situations where the size of the three-dimensional image is changed.

For example, as explained above, in a situation where the user directly changes the size of the three-dimensional image, or where the user trims the three-dimensional image, the conversion characteristic newly produced by the user may be used because in these situations, the user changes the size of the three-dimensional image with an intention.

In a situation where the display size of the three-dimensional image changes when the user does not particularly desire to change the size of the three-dimensional image (in a situation where the size of the three-dimensional image as displayed on the screen changes but the user does not particularly desire to change the size of the three-dimensional image itself, as in a case, for example, where a thumb-nailed three-dimensional image is to be expanded for editing, or where the size of the three-dimensional image is indirectly changed as the display size of the three-dimensional image is changed in an application used for editing the three-dimensional image), the pop-out amount of the three-dimensional image may be kept constant based on a conversion characteristic whereby a previously stored pop-out amount is kept constant. In such situations where the size of the three-dimensional image changes when the user does not so intend, the three-dimensional image may be displayed, with the pop-out amount of the three-dimensional image of the original size maintained so as not to cause discomfort to the user.

Where the size of the three-dimensional image changes as the display size in the application changes, the display size in the application may be held as a parameter to enable the pop-out amount of the three-dimensional image to be adjusted when the display size in the application is changed.

Figure 13:
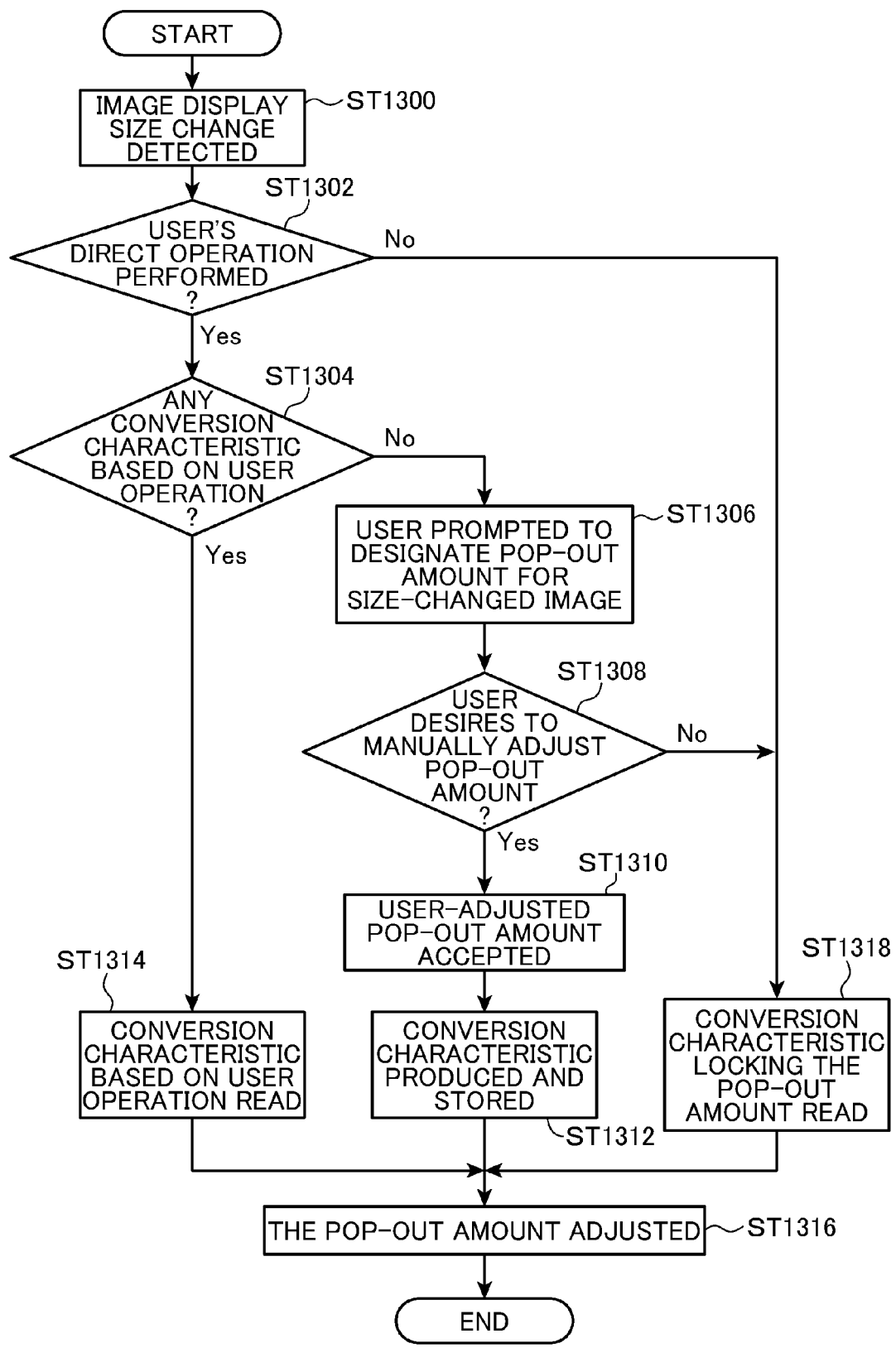
FIG. 13 is a flowchart illustrating an example of operation of the three-dimensional image editing device according to the embodiment 1 of the present invention.

FIG. 13 is a flowchart illustrating an example of the operation of the three-dimensional image editing device 100 and a method of editing a three-dimensional image in a case where the conversion characteristic is selectively used according to the situations where the size of the three-dimensional image is changed.

First, in step ST1300, a change in the display size of the three-dimensional image is detected, then proceeding to step ST1302. A judgment is made in step ST1302 as to whether the change in size of the three-dimensional image was effected by the user's direct operation. The direct operation herein means a direct operation by the user performed on the size of the three-dimensional image including changing the size of the three-dimensional image, trimming the three-dimensional image, and the like.

When the direct operation by the user on the three-dimensional image is detected in step ST1302, the procedure proceeds to step ST1304, where a judgment is made as to whether a conversion characteristic based on the user operation is stored in the conversion characteristic memory 112 for a three-dimensional image having the size changed.

When a judgment is made that a conversion characteristic based on the user operation is not stored in the conversion characteristic memory 112 in step ST1304, the procedure proceeds to step ST1306 to cause the monitor 114 to display a message prompting the user to specify the pop-out amount for the image of which the size has been changed, proceeding to step ST1308.

In step ST1308, a message is displayed to inquire of the user whether the pop-out amount is to be adjusted, and when the user intends to adjust the pop-out amount, the procedure proceeds to step ST1310. The adjustment of the pop-out amount by the user is received in step ST1310, whereupon the conversion characteristic producer 110 produces a fresh conversion characteristic and stores it in the conversion characteristic memory 112 in step ST1312, proceeding to step ST1316. In step ST1316, the pop-out amount adjuster 108 adjusts the pop-out amount of the three-dimensional image, terminating the procedure.

In step ST1304, when the conversion characteristic based on the user operation is already stored in the conversion characteristic memory 112, the procedure proceeds to step ST1314. In step ST1314, the conversion characteristic based on the user operation is read from the conversion characteristic memory 112, whereupon in step ST1316 the pop-out amount is adjusted according to the read conversion characteristic, terminating the procedure.

In step ST1302, when a judgment is made that no direct operation by the user has been performed on the image, the procedure proceeds to step ST1318. In step ST1318, the conversion characteristic whereby the pop-out amount is locked is read from the conversion characteristic memory 112, whereupon in step ST1316 the pop-out amount adjuster 108 adjusts the pop-out amount based on the read conversion characteristic, terminating the procedure.

In step ST1308, the procedure proceeds to step ST1318 also when the pop-out amount is not adjusted, and in step ST1318, the conversion characteristic locking the pop-out amount is read, whereupon in step ST1316 the pop-out amount is adjusted based on the read conversion characteristic, terminating the procedure.

As described above, the three-dimensional image editing device 100 according to the embodiment 1 of the invention uses a predetermined conversion characteristic to adjust the pop-out amount when the user expands or contracts a three-dimensional image. This obviates the necessity of adjusting the pop-out amount each time the user expands or contracts a three-dimensional image and reduces the time and effort the user must expend.

Further, since a fresh conversion characteristic is produced using results of a change in the image size and an adjustment of the pop-out amount effected by the user, a conversion characteristic in accordance with the user's preference can be produced and the pop-out amount can be adjusted according to the user's preference.

Although the three-dimensional image editing device 100 according to the above embodiment comprises two functions, a function of previously storing conversion characteristics and a function of producing a conversion characteristic based on the user operation, having both functions is not essential, and the three-dimensional image editing device of the invention may be provided with only one of these functions.

Although the above embodiment is described referring, by way of example, to a case where the size and the pop-out amount of the three-dimensional image are adjusted, the present invention is not necessarily used to edit a photograph album and may be used in any cases where the size of the three-dimensional image is changed. The present invention may be used in cases where, for example, a three-dimensional image is trimmed and expanded, or a template is synthesized.

Although the above embodiment is described referring, by way of example, to a case where when a fresh conversion characteristic is produced, the user adjusts the pop-out amount before or after the size of the three-dimensional image is adjusted, the user need not necessarily adjust the pop-out amount before or after the size of the three-dimensional image is adjusted. The user may prefer not to adjust the pop-out amount before or after the size of the three-dimensional image is adjusted. In that case, the conversion characteristic is produced based on a pop-out amount changed as a result of the adjustment of the size of the three-dimensional image.

Although the above embodiment is described referring, by way of example, to a case where the template image is a double-spread image, the template image is not limited thereto. The template image may be, for example, a single-page template image.

Although the check box is used for settings to keep the pop-out amount constant in the above embodiment, using the check box is not the only alternative. For example, an interface permitting an ON-OFF switching may be used. Although the check box is provided for each three-dimensional image in the above embodiment, the check box need not be provided for every three-dimensional image. For example, a check box for applying the same pop-out amount to all the pages in the photograph album may be provided as an environment setting item for the template image or a check box for applying the same pop-out amount to all the images in the same page may be provided.

Embodiment 2

While, in the embodiment 1, a case where a conversion characteristic representing the relationship between the size and the pop-out amount of an image is applied to one image is described by way of example, in the embodiment 2, a case where the conversion characteristic produced for adjustment of the size and the pop-out amount of one image is applied to another image will be described. Since the three-dimensional image editing device according to the embodiment 2 has the same basic configuration as the three-dimensional image editing device 100 described in the embodiment 1, the function block for the former is omitted. The operation of the three-dimensional image editing device according to the embodiment 2, which is the same as that of the three-dimensional image editing device 100, is also omitted.

Also in the embodiment 2, the conversion characteristic is produced based on the user operation. FIGS. 14A and 14B illustrate a case where a three-dimensional image 204 disposed in a template image 202 is edited in a conversion characteristic production mode. Referring to FIG. 14A, suppose that a knob 208 in a bar 206 was moved by the user and the pop-out amount of the three-dimensional image 204 has been determined. The size of the three-dimensional image 204 (length in the lateral direction) and the pop-out amount of the three-dimensional image 204 as of the time when the pop-out amount has been determined are stored in the conversion characteristic producer 110.

FIG. 14B illustrates a case where the three-dimensional image 204 is expanded, and the knob 208 located in the position shown by a broken line 210 is moved in a direction indicated by an arrow 212 to adjust the pop-out amount. Also in this case, the size of the three-dimensional image 204 (length in the lateral direction) and the pop-out amount of the three-dimensional image 204 are stored in the conversion characteristic producer 110.

The conversion characteristic produced for the case shown in FIGS. 14A and 14B is illustrated by the graph in FIG. 15. In the graph representing the relationship between the image size and the pop-out amount, a point representing the image size and the pop-out amount stored for the case corresponding to FIG. 14A is plotted in the graph as a point 214, and a point representing the image size and the pop-out amount stored for the case corresponding to FIG. 14B is plotted in the graph as a point 216. The conversion characteristic producer 110 produces a line 218 passing through the two points, point 214 and the point 216, to obtain a conversion characteristic.

Figure 16:
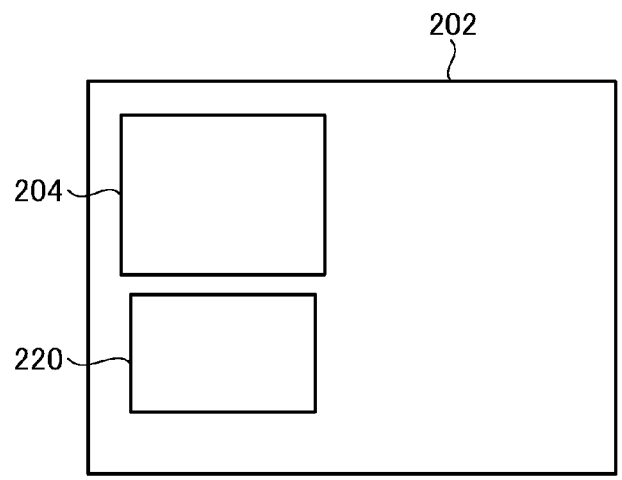
FIG. 16 is a view illustrating a case where a new three-dimensional image is disposed in the template image.

Subsequently, suppose that a fresh three-dimensional image 220 is disposed beneath the three-dimensional image 204 disposed in the template image 202 as illustrated in FIG. 16.

The three-dimensional image 220 disposed in the template image 202 is automatically adjusted to a size that suits the template image 202. The pop-out amount of the three-dimensional image 220 is automatically adjusted based on the conversion characteristic produced in the editing of the three-dimensional image 204 as illustrated in FIG. 15. In other words, the pop-out amount of the three-dimensional image 220 is determined according to the conversion characteristic produced for another image.

In the case illustrated in FIG. 16, also when still another three-dimensional image is disposed in the template image 202, the conversion characteristic shown in FIG. 15 is applied. In other words, the same conversion characteristic is applied to all the three-dimensional images disposed in the template image 202. Thus, a consistent relationship between the image size and the pop-out amount can be maintained in the template image 202. Whether the same conversion characteristic is to be set for another three-dimensional image in the template image 202 can be set by the user on the setting screen or the like.

Figure 17A:
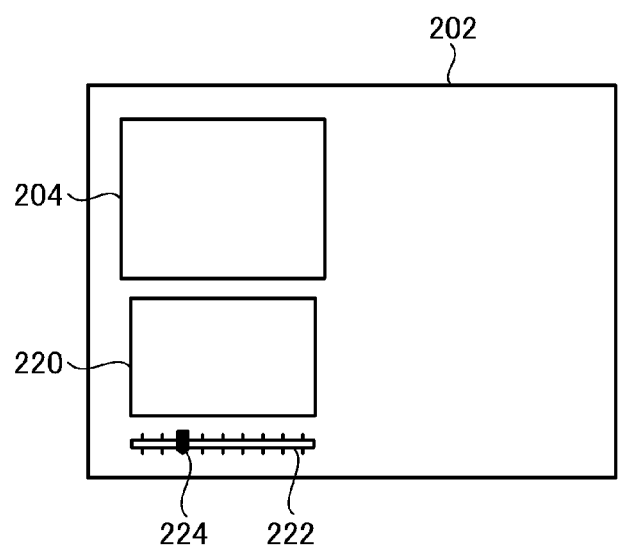
FIG. 17A is a view illustrating a case where the pop-out amount of the newly disposed three-dimensional image has been automatically adjusted.

FIG. 17A illustrates a case where the pop-out amount of the three-dimensional image 220 disposed in the template image 202 is adjusted automatically.

Figure 17B:
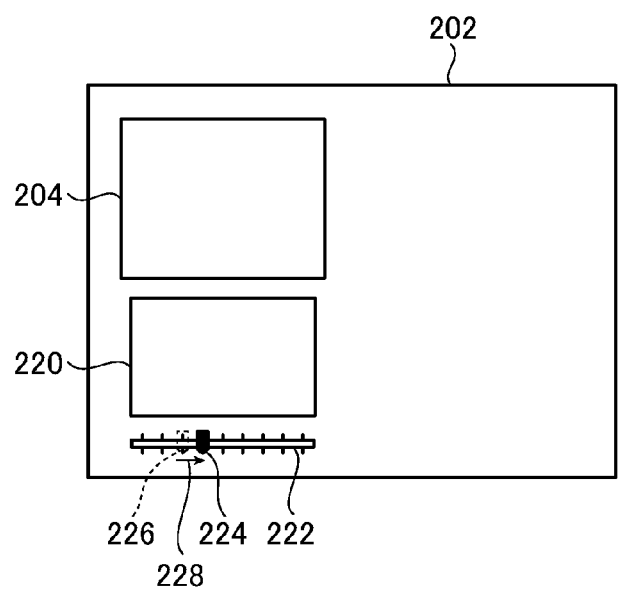
FIG. 17B is a view illustrating a case where the pop-out amount of the newly disposed three-dimensional image has been adjusted by the user.

FIG. 17B illustrates a case where the pop-out amount of the three-dimensional image 220 of which the pop-out amount has been automatically adjusted is readjusted by the user. The pop-out amount of the three-dimensional image 220 is adjusted using a bar 222 and a knob 224 displayed beneath the three-dimensional image 220. Such readjustment may be made when, for example, the automatically adjusted pop-out amount of a three-dimensional image does not suit the user's preference.

The user moves the knob 224, which was located in the position shown by the broken line 226, in a direction indicated by an arrow 228 to adjust the pop-out amount. The adjusted pop-out amount and the size of the three-dimensional image 220 (length in the lateral direction) are stored in the conversion characteristic producer.

Figure 18:
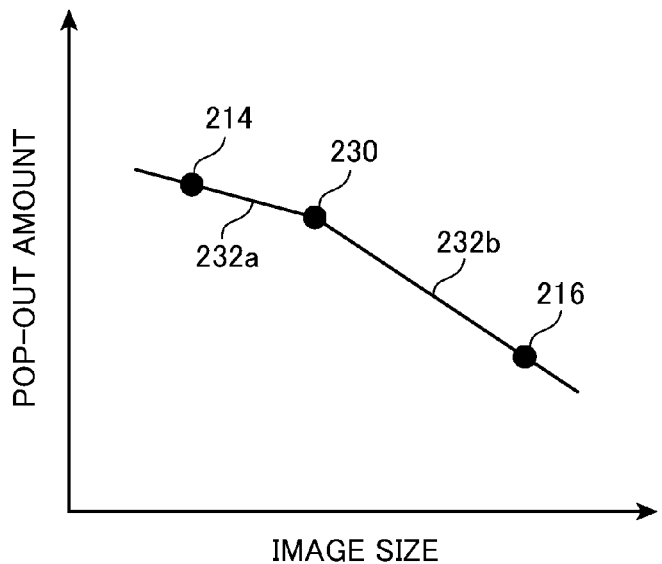
FIG. 18 is a graph illustrating a renewed conversion characteristic.

FIG. 18 illustrates a graph representing a conversion characteristic defining the relationship between the image size and the pop-out amount produced when the user adjusts the pop-out amount of the three-dimensional image 220 after the conversion characteristic is produced based on the change of the size of the three-dimensional image 204 and the adjustment of the pop-out amount thereof effected by the user. A point 230 is the point newly plotted as a result of the adjustment of the three-dimensional image 220.

The conversion characteristic produced by the conversion characteristic producer is similar to a line graph composed of a segment 232a connecting the point 214 and a point 230 and a segment 232b connecting the point 230 and the point 216, the segments meeting at the point 230. Thus, the conversion characteristic producer 110 produces a conversion characteristic based on three points each plotted to represent an image size and a pop-out amount set by the user. In the conversion characteristic production mode, the conversion characteristic producer renews the existing conversion characteristic each time the user adjusts the pop-out amount of the three-dimensional image in the template image 202.

The conversion characteristic producer 110 stores the produced conversion characteristic in the conversion characteristic memory 112. When the conversion characteristic is renewed each time the user adjusts the pop-out amount of the three-dimensional image in the template image 202, the conversion characteristic producer 110 can produce a conversion characteristic that suits the user's preference still better than when the conversion characteristic is produced based on two points.

The three-dimensional image newly disposed in the template image 202 after the conversion characteristic illustrated in FIG. 18 is produced has its pop-out amount adjusted based on the latest conversion characteristic.

Figure 19:
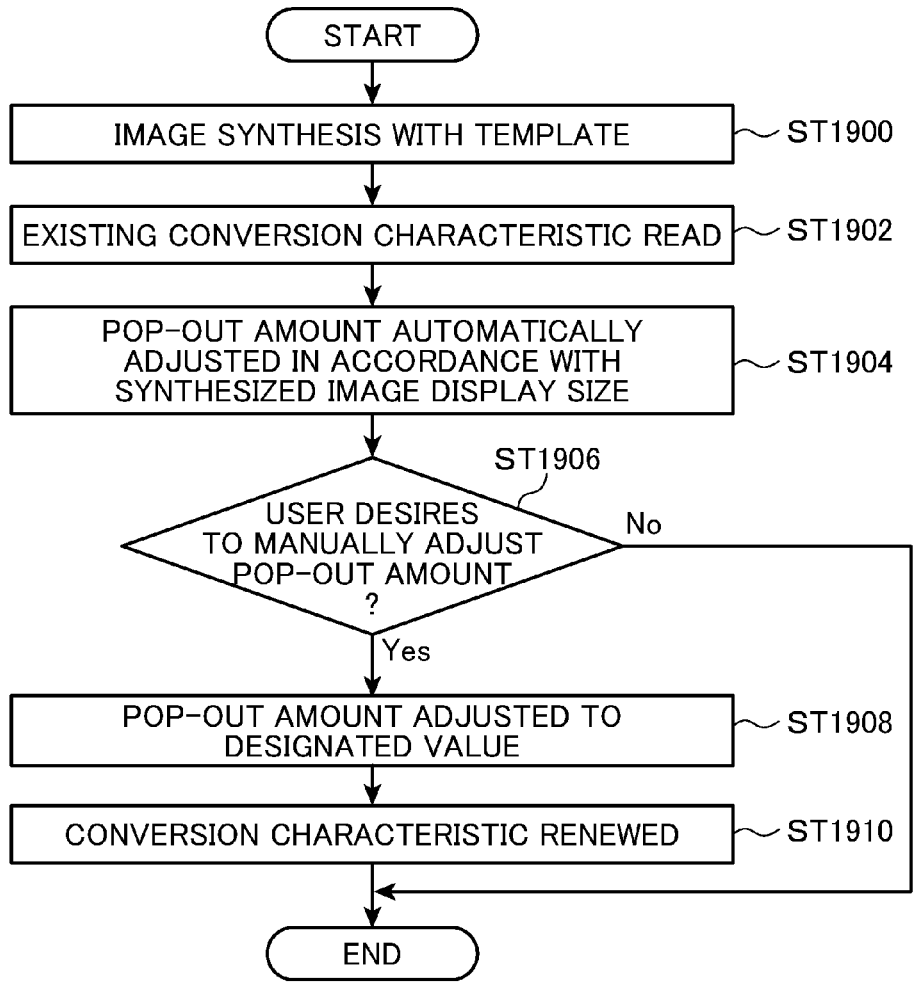
FIG. 19 is a flowchart illustrating an example of operation of the three-dimensional image editing device according to the embodiment 2 of the present invention.

FIG. 19 is a flowchart illustrating the operation of the three-dimensional image editing device and the three-dimensional image editing method according to the embodiment 2.

Upon synthesis of the three-dimensional image into the template image in step ST1900, the procedure proceeds to step ST1902, where an existing conversion characteristic is read from the conversion characteristic memory 112, proceeding to step ST1904. In step ST1904, the pop-out amount adjuster 108 adjusts the pop-out amount of the three-dimensional image synthesized into the template image and having its size changed according to the conversion characteristic read from the conversion characteristic memory 112, then proceeding to step ST1906. In step ST1906, a message is displayed inquiring of the user whether the pop-out amount is to be adjusted manually. When the user intends to adjust the pop-out amount manually, the procedure proceeds to step ST1908, where the pop-out amount adjuster 108 adjusts the pop-out amount of the three-dimensional image based on a value designated by the user, thereafter proceeding to step ST1910. In step ST1910, the conversion characteristic producer 110 renews and stores the conversion characteristic in the conversion characteristic memory 112, terminating the procedure. In step ST1906, when the user does not intend to adjust the pop-out amount manually, the procedure is terminated.

As described above, according to the embodiment 2 of the three-dimensional image editing device of the invention, the conversion characteristic produced according to the change in the size and the pop-out amount of one three-dimensional image is applied to another three-dimensional image disposed in the same template image. Thus, the conversion characteristic for a plurality of three-dimensional images disposed in the same template image can be made consistent.

Further, since the conversion characteristic is renewed based on the change in the image size and the pop-out amount effected by the user for another image disposed in the same template image, a conversion characteristic that better suits the user's preference can be produced.

Particularly in a photograph album, the viewer can view the photographs without feeling discomfort when the pop-out amount of three-dimensional images having the same size in the same page is consistent.

While, in this embodiment, the conversion characteristic representing the relationship between the image size and the pop-out amount produced by plotting two points is renewed using an additional third point, the plotted points are not limited in number to three and may be four or more. The greater the number of plotted points, the better the conversion characteristic suits the user's preference.

While, in this embodiment, the same conversion characteristic is applied to all the three-dimensional images disposed in the same template image, the same conversion characteristic need not necessarily be applied to all the three-dimensional images. In a template image showing a double spread in a photograph album, for example, the same conversion characteristic may be applied to the three-dimensional images on the left page. Further, the range to which the conversion characteristic is applied based on the page of the template image need not be limited, and how the conversion characteristic is applied to the three-dimensional images preferably is set freely by the user. For example, a region designating means for designating a region to which the same conversion characteristic is applied may be provided to apply the same conversion characteristic to the three-dimensional images contained in a region designated by the user, or the same conversion characteristic may be applied to a plurality of images selected by dragging with the mouse.

According to the present invention, as described above, since the pop-out amount is adjusted based on a conversion characteristic defining the relationship between the size and the pop-out amount of a three-dimensional image as the size of the three-dimensional image is changed, the pop-out amount of the three-dimensional image can be adjusted to a pop-out amount preferred by the user.

Although the pop-out amount is adjusted using a scroll bar according to the above embodiments of the invention, the interface for adjusting the pop-out amount is not limited thereto. For example, the +/− button may be used, numerals may be entered directly, or three values, large, middle, and small, may be selected from a drop-down list.

Although, according to the above embodiments of the invention, a linear conversion characteristic is produced as a fresh conversion characteristic, the conversion characteristic need not necessarily be linear. For example, an exponential conversion characteristic may be produced. Preferably, the kinds of conversion characteristics that may be produced are previously set. Further, an editing screen on which the user may edit a conversion characteristic produced by the conversion characteristic producer 110 may be provided. When the user can further edit a conversion characteristic produced by the conversion characteristic producer 110, a conversion characteristic that better suits the user's preference can be produced.

Further, in the above embodiments of the invention, the image size and the pop-out amount of an adjusted three-dimensional image may be recorded to renew the image size or the pop-out amount of the original three-dimensional image. The pop-out amount may be stored in the tag information or in text data or the like associated with the image data. The image data and the text data can be associated by, for example, naming the data files such that those different only in extension are of the same data. The tag information and text data may store an image display size as of the time when the pop-out amount is set, hardware information as of the time when the pop-out amount is set, the 3D type as of the time when the pop-out amount is set, and the like.

In the above description of the embodiments of the invention, the internal memory for storing the image data and the conversion characteristic memory for storing the conversion characteristics are described as separate memories, but there need not necessarily be provided two memories. One memory may be adapted to store the image data and the conversion characteristics.

According to the embodiments of the invention, the conversion characteristic may be determined based on such merchandise as a photograph album or a 3D print in lieu of the user determining the conversion characteristic. When a photograph album is produced, for example, the conversion characteristic is produced considering the layout of photographs in the photograph album. Since the viewer of a photograph album views photographs therein by turning pages thereof, a three-dimensional image disposed closer to the center of the page tends to be perceived with enhanced depth because of the relative position of the so located three-dimensional image to the viewer's eyes. Therefore, a conversion characteristic that enhances the depth effect to a greater degree is applied to a three-dimensional image disposed closer to the center of the page.

Figure 20:
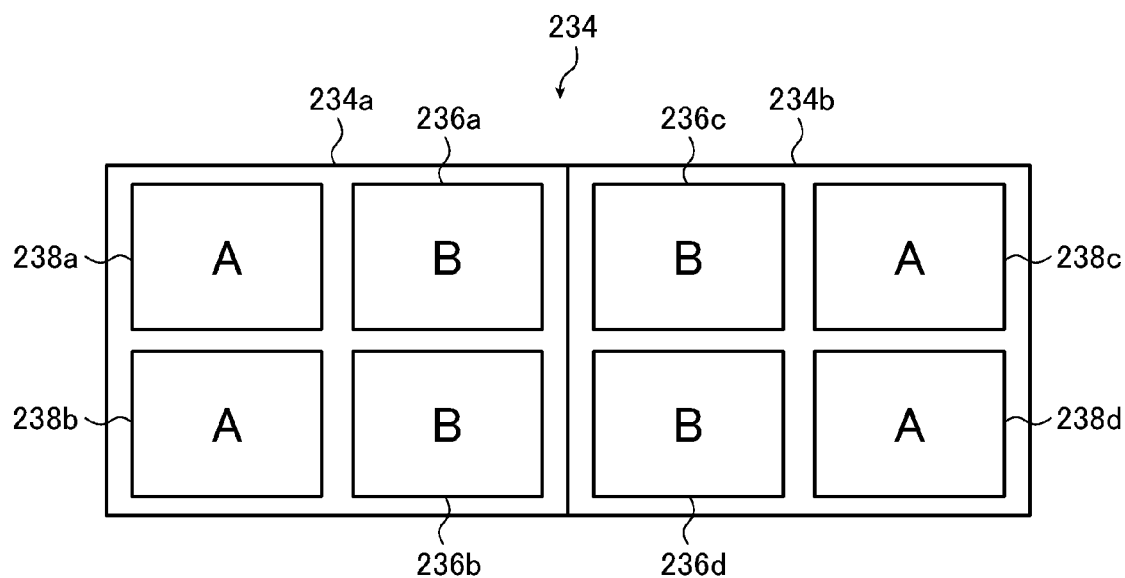
FIG. 20 is a view illustrating an example of a layout in a photograph album.

FIG. 20 shows an example of the template image as of the time when the photograph album is edited. In FIG. 20, a left page 234a and a right page 234b connect and are shown as a double-page spread image 234.

When three-dimensional images are arranged in the double spread image 234, different conversion characteristics are applied to three-dimensional images 236a to 236d disposed closer to the center of the double spread image 234 from those applied to three-dimensional images 238a to 238d disposed closer to the ends of the pages.

Figure 21:
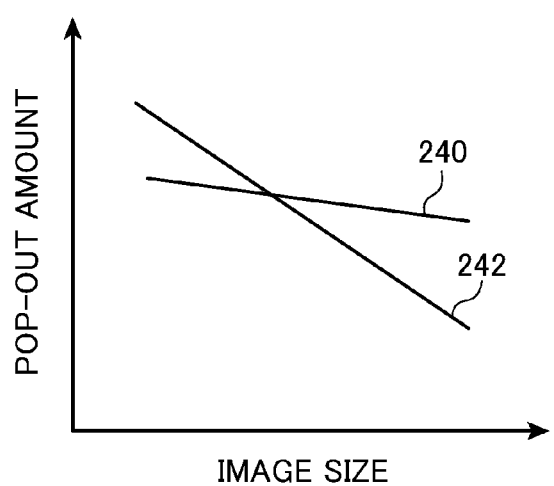
FIG. 21 is a graph illustrating conversion characteristics in a case where the conversion characteristic is changed according to the layout in a photograph album.

FIG. 21 illustrates examples of the conversion characteristic each representing the relationship between the image size and the pop-out amount considering the layout in the photograph album.

When the size of any of the three-dimensional images 236a to 236d disposed closer to the center of the double spread image 234 is changed, a conversion characteristic represented by a segment 240 is applied. The conversion characteristic represented by the segment 240 is a conversion characteristic whereby upon expansion of the image, the pop-out amount is reduced not greatly but only slightly.

A conversion characteristic represented by a segment 242 is applied to the three-dimensional images 238a to 238d disposed closer to the ends of the page. The conversion characteristic represented by the segment 242 is a conversion characteristic reducing the pop-out amount as the image size increases. Accordingly, the segment 242 has a great slope as compared with the segment 240.

Thus, when an image closer to the center of the photograph album has its pop-out amount reduced by a relatively more moderate reduction amount as the image size expands, a sufficient pop-out amount can be secured also when the size of an image located closer to the center, where the viewer more easily perceives the depth, is expanded.

Also when the conversion characteristic to be applied is determined considering the position in which the three-dimensional image is disposed, the conversion characteristic is preferably renewed accordingly as the user changes the size and the pop-out amount of the three-dimensional image automatically adjusted with the determined conversion characteristic.

When the conversion characteristic of one page is changed in a photograph album containing a plurality of pages, it is preferable to change the conversion characteristics of not only that one page but a plurality of pages, such as those preceding and following that one page.

As illustrated in FIG. 22, when the three-dimensional image editing device 100 edits three-dimensional images arranged in a photograph album containing pages 1, 2, 3, 4, ..., the conversion characteristic producer 110 sets default conversion characteristics that do not greatly vary among these pages.

There is no limitation to the method of setting default conversion characteristics; three setting methods are described below by way of illustration.

(Setting Method 1)

A conversion characteristic for setting a moderate pop-out amount for all the pages is set as default.

(Setting Method 2)

The conversion characteristic is varied according to the size of merchandise. For large merchandise, a moderate pop-out amount is set as default so as not to fatigue the eye. Conversely, for small merchandise, a relatively large pop-out amount is set.

(Setting Method 3)

The pop-out amount is varied among pages in a photograph album. For example, a moderate pop-amount is set for images in leading pages, a large pop-out amount for images in pages located closer to the middle, and a moderate pop-amount for images in pages closer to the end of a photograph album.

The defaults of the conversion characteristics may be set by, for example, the service provider for a photograph album as they desire.

When the conversion characteristic (pop-out amount) applied to a page is changed by the user after a default of conversion characteristic is set, the conversion characteristic producer 110 changes or renews the conversion characteristics to be applied to the preceding and the following page according to the changed conversion characteristic.

When the conversion characteristic for page 10, for example, is changed, the conversion characteristic producer 110 checks the difference between the conversion characteristic for page 10 illustrated in FIG. 23A (conversion characteristic changed by the user) and the conversion characteristic for page 11 illustrated in FIG. 23B (default conversion characteristic). FIGS. 23A and 23B are graphs illustrating conversion characteristics to be applied to page 10 and page 11, respectively, wherein the vertical axis shows the pop-out amount, the horizontal axis the image size. When the difference between them (e.g., difference in area) is not less than a given value, the default conversion characteristic for page 11 is changed to a mean value of the conversion characteristic for page 10 and the conversion characteristic for page 11 as illustrated by a dotted line in FIG. 24. The same applies to page 9.

As described above, when, according to the conversion characteristic for a certain page, the conversion characteristics for the preceding and the following page are adjusted, the conversion characteristics can change among the pages of a photograph album without causing discomfort to the user viewing the photograph album.

The above-described processing may be applied only to those pages for which a default conversion characteristic has been set. For example, when the user has changed the conversion characteristic for page 11 and it is after the user has changed the conversion characteristic for page 10, then the conversion characteristic for page 10 is not renewed. In the examples given above, when the conversion characteristic for a certain page is changed, the conversion characteristics for the preceding and the following page are adjusted. However, the present invention is not limited thereto; the conversion characteristics for two or more pages preceding and following that certain page may be adjusted.

Figure 25:
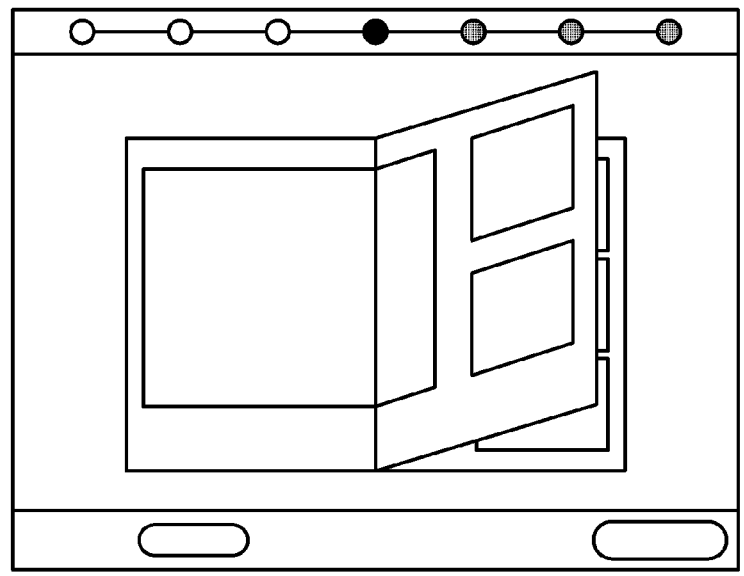
FIG. 25 is a view of an example illustrating a page of a photograph album being turned over.

Further, when the display screen is showing a page as it is turned over as illustrated in FIG. 25, the page is difficult to see. Therefore, the pop-out amount adjuster 108 preferably makes adjustment such that the pop-out amounts of the three-dimensional images placed in the page being turned over are small while the page is being turned.

Further, the storage unit of the conversion characteristics is not limited in any manner. For example, conversion characteristics having a one-to-one relationship with the individual three-dimensional images may be stored in the conversion characteristic memory 112, or the conversion characteristics may be stored by user of the three-dimensional image editing device 100 or by display device (kinds of the monitor 114) that display the three dimensional images. Alternatively, the conversion characteristics may be stored by combination of two or more of three-dimensional image, user, and display device. The conversion characteristics for the individual three-dimensional images may be stored by user, for example.

Where the conversion characteristics are stored by user, the three-dimensional image editing device 100 needs to recognize the individual users, but the method of recognition is not limited in any manner. The three-dimensional image editing device 100 may recognize the individual users using, for example, person authentication techniques such as the log-in information, and fingerprint authentication, image analysis. To that end, the three-dimensional image editing device 100 may be equipped with a camera and analyze an image of a user acquired by this camera to readily recognize the individual users.

When the conversion characteristics are stored by user as described above, the individual users can adjust the pop-out amount of a three-dimensional image according to their preference.

Figure 26:
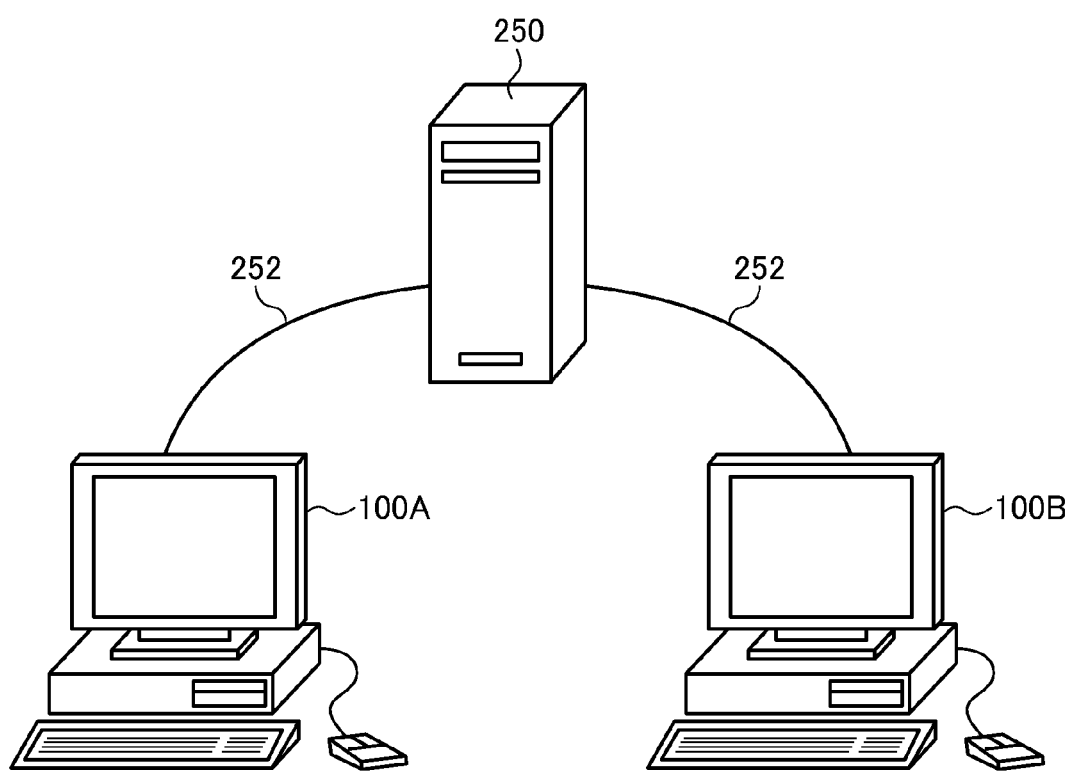
FIG. 26 illustrates an example of configuration of a three-dimensional image editing system where a plurality of three-dimensional image editing devices share three-dimensional images.

Described below is a three-dimensional image editing system wherein three-dimensional images are shared among a plurality of three-dimensional image editing devices or the users thereof as an example of a case where the conversion characteristics are stored by user. FIG. 26 is a block diagram illustrating a configuration of such three-dimensional image editing system. The three-dimensional image editing system illustrated in that figure comprises two three-dimensional image editing devices 100A, 100B and a server 250 connected with these two three-dimensional image editing devices 100A, 100B via a network 252.

Where, for example, a three-dimensional image stored in the server 250 is shared by two three-dimensional image editing devices 100A, 100B via the network 252, the pop-out amount adjuster of one of the three-dimensional image editing devices, 100A, can adjust the pop-out amount of the three-dimensional image based on the conversion characteristic corresponding to the user thereof, provided that the conversion characteristics are stored by user. Likewise, the pop-out amount adjuster of the other three-dimensional image editing device 100B can adjust the pop-out amount of the three-dimensional image based on the conversion characteristic corresponding to the user thereof.

The same applies to a case where, for example, a single three-dimensional image editing device is shared by a plurality of users, as well as to a case as described above where a plurality of three-dimensional image editing devices are connected via a network.

The display device includes, for example, a camera, a smartphone, a portable phone, a television, and a personal computer. Where the conversion characteristics are stored by display device, the conversion characteristics are stored by kind of the display device as, for example, a conversion characteristic corresponding to a camera. Where the display screen of the display device or the display size is large, the user's eye is liable to be fatigued to a greater extent. By storing a conversion characteristic setting an increasingly smaller pop-out amount as the display screen increases, the pop-out amount of the three-dimensional images can be adjusted according to the screen size of the display device.

By storing the conversion characteristics by display device as described above, the three-dimensional images can be adjusted to an appropriate pop-out amount.

When any one of the display device, a user viewing a three-dimensional image displayed on the display device, and the three-dimensional image moves, the pop-out amount adjuster 108 preferably changes the conversion characteristic applied to the three-dimensional image according to the movement.

Where the display device moves as when, for example, the user moves it holding it in his/her hand, the user would have difficulty trying to see the display screen. It is therefore preferable to curb the pop-out amount for the three-dimensional image. Where, for example, the display device is at a standstill, a normal conversion characteristic is used from among the conversion characteristics stored in the conversion characteristic memory 112 to adjust the pop-out amount of a three-dimensional image. In contrast, when the display device moves, the pop-out amount of a three-dimensional image is adjusted using a conversion characteristic setting an increasingly smaller pop-out amount than a normal conversion characteristic as the movement of the display device grows larger.

The movement of the display device may be detected by, for example, a motion sensor (acceleration sensor) or a gyro sensor. Acceleration sensors include a 1-axis type capable of sensing one direction, a two-axis type capable of sensing two directions, X and Y, and a 3-axis type capable of sensing three directions, X, Y and Z. Note that motion sensors are not to be confused with gyro sensors; gyro sensors, used to detect an inclination, are different in both function and application. There is, however, a 6-axis sensor, a high-performance device combining a 3-axis acceleration sensor and a 3-axis gyro sensor.

The same applies where the user moves. When, for example, the user is at a standstill, a normal conversion characteristic is used to adjust the pop-out amount of a three-dimensional image, whereas when the user moves, a conversion characteristic setting an increasingly smaller pop-out amount as the user's movement grows larger is used for adjustment of the pop-out amount of the three-dimensional image.

The user's movement may be detected using, for example, imaging information obtained from a camera. Specifically, a camera is installed in the three-dimensional image editing device 100 to image the user and judges his/her movement. Alternatively, a human presence sensor, which employs infrared light, ultrasound, and visual light and is used to control illumination or a television, may be used to detect user movement.

The same applies when editing of a three-dimensional image involves movement thereof during editing (e.g., movement of a three-dimensional image from one place to another, resizing and rotation of a three-dimensional image). When, for example, a three-dimensional image is at a standstill, a normal conversion characteristic is used to adjust the pop-out amount of the three-dimensional image, whereas when a three-dimensional image is moved, a conversion characteristic setting an increasingly smaller pop-out amount as the movement of the three-dimensional image grows larger is used to adjust the pop-out amount.

Further, the conversion characteristic memory 112 may store a conversion characteristic setting an increasingly smaller pop-out amount corresponding to the image size as the movement of one or more of a combination of two or more of the display device, the user, and the three-dimensional image grows larger, so that when one or more of the combination of two or more of the display device, the user, and the three-dimensional image moves, a conversion characteristic setting an increasingly smaller pop-out amount corresponding to the image size as the movement of one or more of the combination grows larger may be used to adjust the pop-out amount of the three-dimensional image.

Note that the present invention is not limited to a photograph album, which is but an example taken in the above embodiment to illustrate an application of the present invention and may be also applied to various kinds of image contents comprising a plurality of pages, such as a calendar.

A program for operating a computer to perform the respective functions of the three-dimensional image editing device of which preferred embodiments of the invention are described above, i.e., a program for causing a computer to implement the functions of the three-dimensional image editing device of the invention, a program for causing a computer to function as individual means of the three-dimensional image editing device of the invention, or a program for causing a computer to implement the steps of the three-dimensional image editing method of the invention as a procedure, is also an embodiment of the present invention. Further, a computer readable recording medium on which such program is recorded is also an embodiment of the present invention.

The embodiments of the invention described above only illustrate examples of the invention and do not limit the configuration of the invention in any manner. The three-dimensional image editing device of the invention is not limited to the above embodiments and may be modified or implemented in various manners without departing from the spirit and scope of the invention.

For example, where the monitor 114 is constituted by a touch panel or the like, the operation performed using the mouse or the like of the user input unit 116 described above may be performed with the user's finger.

INDUSTRIAL APPLICABILITY

The three-dimensional image editing device of the invention may be used where a three-dimensional image is edited.

We claim:

1. A three-dimensional image editing device, comprising:
an image size changing unit for changing a size of a three-dimensional image;
an adjusting unit for adjusting a pop-out amount of the three-dimensional image according to a change in size of the three-dimensional image effected by the image size changing unit based on a conversion characteristic defining a relationship between an image size of the three-dimensional image and a pop-out amount of the three-dimensional image; and
a conversion characteristic producing unit for producing the conversion characteristic based on the change in size and adjustment of the pop-out amount of the three-dimensional image entered through an input unit,
wherein the adjusting unit adjusts a pop-out amount of a second three-dimensional image using the conversion characteristic produced by the conversion characteristic producing unit based on a change in size and an adjustment of a pop-out amount of a first three-dimensional image.

2. The three-dimensional image editing device according to claim 1, further comprising a conversion characteristic storing unit for storing the conversion characteristic defining the relationship between the image size and the pop-out amount of the three-dimensional image,
wherein the adjusting unit adjusts the pop-out amount of the three-dimensional image based on the conversion characteristic previously stored in the conversion characteristic storing unit.

3. The three-dimensional image editing device according to claim 1, wherein when the size of the three-dimensional image is changed by the image size changing unit according to the entered change in size, the adjusting unit adjusts the pop-out amount of the three-dimensional image using the conversion characteristic produced by the conversion characteristic producing unit.

4. The three-dimensional image editing device according to claim 1, wherein when the image size changing unit has changed a size of the second three-dimensional image positioned in a specific region, the adjusting unit adjusts the pop-out amount of the second three-dimensional image using the conversion characteristic produced by the conversion characteristic producing unit based on the change in size and the adjustment of the pop-out amount of the first three-dimensional image positioned in the region.

5. The three-dimensional image editing device according to claim 1, wherein the conversion characteristic producing unit renews the conversion characteristic produced based on the change in size and the adjustment of the pop-out amount of a first three-dimensional image disposed in a specific region based on the change in size and the adjustment of the pop-out amount entered for a second three-dimensional image disposed in the region.

6. The three-dimensional image editing device according to claim 1, wherein the adjusting unit applies the conversion characteristic that is same for a plurality of images designated through an input unit.

7. The three-dimensional image editing device according to claim 1, wherein the adjusting unit determines the conversion characteristic to be applied based on a position in which the three-dimensional image is disposed.

8. The three-dimensional image editing device according to claim 7, wherein when the image size changing unit changes the size of the three-dimensional image positioned in a specific region, the adjusting unit determines the conversion characteristic to be applied based on a position in which the three-dimensional image is disposed.

9. The three-dimensional image editing device according to claim 2, wherein the conversion characteristic storing unit stores the conversion characteristic for each of the three-dimensional images.

10. The three-dimensional image editing device according to claim 2, wherein the conversion characteristic storing unit stores the conversion characteristic for each user of the three-dimensional image editing device.

11. The three-dimensional image editing device according to claim 2, wherein the conversion characteristic storing unit stores the conversion characteristic for each kind of display device that displays the three-dimensional image.

12. The three-dimensional image editing device according to claim 2, wherein the conversion characteristic storing unit stores the conversion characteristic for each combination of two or more of the three-dimensional image, a user of the three-dimensional image editing device, and a kind of display device that displays the three-dimensional image.

13. The three-dimensional image editing device according to claim 2,
wherein the conversion characteristic storing unit stores a first conversion characteristic whereby the pop-out amount corresponding to the image size decreases as a movement of a display device displaying the three-dimensional image grows larger, and
wherein, when the display device moves, the adjusting unit adjusts the pop-out amount of the three-dimensional image using the first conversion characteristic stored in the conversion characteristic storing unit.

14. The three-dimensional image editing device according to claim 2,
wherein the conversion characteristic storing unit stores a second conversion characteristic whereby the pop-out amount corresponding to the image size decreases as a movement of a user viewing the three-dimensional image displayed on a display device grows larger, and
wherein, when the user moves, the adjusting unit adjusts the pop-out amount of the three-dimensional image using the second conversion characteristic stored in the conversion characteristic storing unit.

15. The three-dimensional image editing device according to claim 2,
wherein the conversion characteristic storing unit stores a third conversion characteristic whereby the pop-out amount corresponding to the image size decreases as a movement of the three-dimensional image grows larger, and
wherein, when the three-dimensional image moves, the adjusting unit adjusts the pop-out amount of the three-dimensional image using the third conversion characteristic stored in the conversion characteristic storing unit.

16. The three-dimensional image editing device according to claim 2,
wherein the conversion characteristic storing unit stores a fourth conversion characteristic whereby the pop-out amount corresponding to the image size decreases as a movement of one or more of a combination of two or more of a display device displaying the three-dimensional image, a user viewing the three-dimensional image displayed on the display device, and the three-dimensional image grows larger, and
wherein, when one or more of a combination of the display device, the user, and the three-dimensional image moves, the adjusting unit adjusts the pop-out amount of the three-dimensional image using the fourth conversion characteristic stored in the conversion characteristic storing unit.

17. The three-dimensional image editing device according to claim 1, wherein the three-dimensional image editing device edits three-dimensional images placed in a plurality of pages contained in an image content, and wherein when a user has changed a first conversion characteristic to be applied to a first page, the conversion characteristic producing unit changes a second and a third conversion characteristic to be applied to a second and a third pages preceding and following the first page, respectively, according to the changed first conversion characteristic.

18. The three-dimensional image editing device according to claim 17, wherein when a difference between the first conversion characteristic and the second and the third conversion characteristic is not less than a given value, the conversion characteristic producing unit uses a mean value of the first conversion characteristic and the second and the third conversion characteristic as the second and the third conversion characteristic after the second and the third conversion characteristic are changed.

19. The three-dimensional image editing device according to claim 17, wherein the adjusting unit makes adjustment such that the pop-out amount of the three-dimensional image located in pages being turned is small while the pages are being turned.

20. A three-dimensional image editing system, comprising:
a first and a second three-dimensional image editing device described in claim 1; and
a server connected to the first and the second three-dimensional image editing device via a network,
wherein when a three-dimensional image stored in the server is shared via the network by the first and the second three-dimensional image editing device, an adjusting unit of the first three-dimensional image editing device adjusts the pop-out amount of the three-dimensional image based on the conversion characteristic corresponding to a user of the first three-dimensional image editing device, and an adjusting unit of the second three-dimensional image editing device adjusts the pop-out amount of the three-dimensional image based on the conversion characteristic corresponding to a user of the second three-dimensional image editing device.

21. A three-dimensional image editing method, comprising:
an image size changing step of changing a size of a three-dimensional image;
an adjusting step of adjusting a pop-out amount of the three-dimensional image according to a change in size of the three-dimensional image effected by the image size changing step based on a conversion characteristic defining a relationship between an image size of the three-dimensional image and a pop-out amount of the three-dimensional image; and
a conversion characteristic producing step of producing the conversion characteristic based on the change in size and adjustment of the pop-out amount of the three-dimensional image entered through an input unit,
wherein the adjusting step adjusts a pop-out amount of a second three-dimensional image using the conversion characteristic produced by the conversion characteristic producing step based on a change in size and an adjustment of a pop-out amount of a first three-dimensional image.

22. A non-transitory computer readable recording medium for recording a program for causing the computer to execute the steps of a three-dimensional image editing method, comprising:
an image size changing step of changing a size of a three-dimensional image;
an adjusting step of adjusting a pop-out amount of the three-dimensional image according to a change in size of the three-dimensional image effected by the image size changing step based on a conversion characteristic defining a relationship between an image size of the three-dimensional image and a pop-out amount of the three-dimensional image; and
a conversion characteristic producing step of producing the conversion characteristic based on the change in size and adjustment of the pop-out amount of the three-dimensional image entered through an input unit, wherein the adjusting step adjusts a pop-out amount of a second three-dimensional image using the conversion characteristic produced by the conversion characteristic producing step based on a change in size and an adjustment of a pop-out amount of a first three-dimensional image.

* * * * *